(12) United States Patent
Yoshikawa et al.

(10) Patent No.: US 10,778,951 B2
(45) Date of Patent: Sep. 15, 2020

(54) CAMERAWORK GENERATING METHOD AND VIDEO PROCESSING DEVICE

(71) Applicant: Panasonic Intellectual Property Corporation of America, Torrance, CA (US)

(72) Inventors: Satoshi Yoshikawa, Hyogo (JP); Toshiyasu Sugio, Osaka (JP); Toru Matsunobu, Osaka (JP); Tatsuya Koyama, Kyoto (JP); Shuuhei Sasakura, Osaka (JP); Chisato Yamashita, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/270,931

(22) Filed: Feb. 8, 2019

(65) Prior Publication Data

US 2019/0174109 A1    Jun. 6, 2019

Related U.S. Application Data

(63) Continuation of application No. PCT/JP2017/027833, filed on Aug. 1, 2017.
(Continued)

(51) Int. Cl.
*H04N 13/111* (2018.01)
*G06T 15/20* (2011.01)
(Continued)

(52) U.S. Cl.
CPC ............ *H04N 13/111* (2018.05); *G06T 15/20* (2013.01); *H04N 13/117* (2018.05);
(Continued)

(58) Field of Classification Search
None
See application file for complete search history.

(56) References Cited

U.S. PATENT DOCUMENTS 5,745,126 A * 4/1998 Jain ...................... H04N 13/139
382/154
2010/0329358 A1* 12/2010 Zhang .................. H04N 19/187
375/240.26
(Continued)

FOREIGN PATENT DOCUMENTS

JP    2002-165200    6/2002

OTHER PUBLICATIONS

International Search Report (ISR) dated Oct. 24, 2017 in International (PCT) Application No. PCT/JP2017/027833.
(Continued)

*Primary Examiner* — Reza Aghevli
(74) *Attorney, Agent, or Firm* — Wenderoth, Lind & Ponack, L.L.P.

(57) ABSTRACT

A camerawork generating method includes: generating, from a multi-view video of a same scene captured from different viewpoints, a three-dimensional model for the scene; determining a target scene which is included in the scene and is a target for which a free-viewpoint video of the three-dimensional model as viewed from a virtual camera is to be generated; and generating a camerawork representing a temporal change in a position and an orientation of the virtual camera in the free-viewpoint video.

10 Claims, 12 Drawing Sheets

Related U.S. Application Data

(60) Provisional application No. 62/372,947, filed on Aug. 10, 2016.

(51) Int. Cl.
| | |
|---|---|
| *H04N 21/218* | (2011.01) |
| *H04N 21/234* | (2011.01) |
| *H04N 13/243* | (2018.01) |
| *H04N 13/117* | (2018.01) |
| *H04N 13/279* | (2018.01) |
| *H04N 13/275* | (2018.01) |
| *G06K 9/00* | (2006.01) |

(52) U.S. Cl.
CPC ......... *H04N 13/243* (2018.05); *H04N 13/275* (2018.05); *H04N 13/279* (2018.05); *H04N 21/218* (2013.01); *H04N 21/21805* (2013.01); *H04N 21/234* (2013.01); *G06K 9/00711* (2013.01)

(56) References Cited

U.S. PATENT DOCUMENTS

| | | | | |
|---|---|---|---|---|
| 2013/0278597 | A1* | 10/2013 | Sasaki | H04N 13/305 345/419 |
| 2014/0049605 | A1* | 2/2014 | Chen | H04N 19/52 348/43 |
| 2014/0071235 | A1* | 3/2014 | Zhang | H04N 19/70 348/43 |
| 2014/0161186 | A1* | 6/2014 | Zhang | H04N 19/52 375/240.16 |
| 2014/0168362 | A1* | 6/2014 | Hannuksela | H04N 19/597 348/43 |
| 2014/0286566 | A1* | 9/2014 | Rhoads | G06T 5/001 382/154 |
| 2014/0301467 | A1* | 10/2014 | Thirumalai | H04N 19/56 375/240.16 |
| 2014/0375630 | A1* | 12/2014 | Girdzijauskas | G06T 9/001 345/419 |
| 2017/0085867 | A1* | 3/2017 | Baran | B41M 3/008 |
| 2017/0359570 | A1* | 12/2017 | Holzer | H04N 13/282 |
| 2018/0012330 | A1* | 1/2018 | Holzer | H04N 13/111 |
| 2018/0192033 | A1* | 7/2018 | Gallup | H04N 13/275 |
| 2018/0338128 | A1* | 11/2018 | Trevor | H04N 5/2628 |
| 2019/0051036 | A1* | 2/2019 | Matsunobu | G06T 15/205 |
| 2019/0189006 | A1* | 6/2019 | Toma | G08G 1/0968 |
| 2019/0311526 | A1* | 10/2019 | Sugio | H04N 13/117 |

OTHER PUBLICATIONS

Ryuuki Sakamoto, et al., "Applicability of Camera Works to Free Viewpoint Videos with Annotation and Planning", IEICE Transactions on Information and Systems, vol. E90-D, No. 10, Oct. 1, 2007, pp. 1637-1648.

Fan Chen, et al., "An Autonomous Framework to Produce and Distribute Personalized Team-Sport Video Summaries: A Basketball Case Study", IEEE Transactions on Multimedia, vol. 13, No. 6, Aug. 30, 2011, pp. 1381-1394.

Extended European Search Report dated Apr. 10, 2019 in corresponding European Patent Application No. 17839279.1.

* cited by examiner

CAMERAWORK GENERATING METHOD AND VIDEO PROCESSING DEVICE

CROSS REFERENCE TO RELATED APPLICATIONS

This application is a U.S. continuation application of PCT International Patent Application Number PCT/JP2017/027833 filed on Aug. 1, 2017, claiming the benefit of priority of U.S. Provisional Patent Application No. 62/372,947 filed on Aug. 10, 2016, the entire contents of which are hereby incorporated by reference.

BACKGROUND

1. Technical Field

The present disclosure relates to a camerawork generating method and a video processing device.

2. Description of the Related Art

As a method for distributing a multi-view video, Japanese Unexamined Patent Application Publication No. 2002-165200 discloses a technique in which a video captured from a plurality of viewpoints is distributed in synchronization with viewpoint movement.

In addition, a technique in which videos of a specific scene captured by a plurality of calibrated cameras are used to generate a free-viewpoint video that allows the scene to be seen from any viewpoint is known.

SUMMARY

Generating such a free-viewpoint video requires determination of a camerawork that represents a temporal path of a viewpoint.

The present disclosure has an object to provide a camerawork generating method or a video processing device that enables a camerawork to be determined appropriately.

In order to achieve the aforementioned object, a camerawork generating method according to an aspect of the present disclosure includes: generating, from a multi-view video of a same scene captured from different viewpoints, a three-dimensional model for the scene; determining a target scene that is a target for which a free-viewpoint video of the three-dimensional model as viewed from a virtual camera is to be generated, the target scene being included in the scene; and generating a camerawork representing a temporal change in a position and an orientation of the virtual camera in the free-viewpoint video.

Note that these general or specific aspects may be realized by a system, a method, an integrated circuit, a computer program, or a computer-readable recording medium such as a CD-ROM, or may be realized by any combination of a system, a method, an integrated circuit, a computer program, and a recording medium.

The present disclosure can provide a camerawork generating method or a video processing device that enables a camerawork to be determined appropriately.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
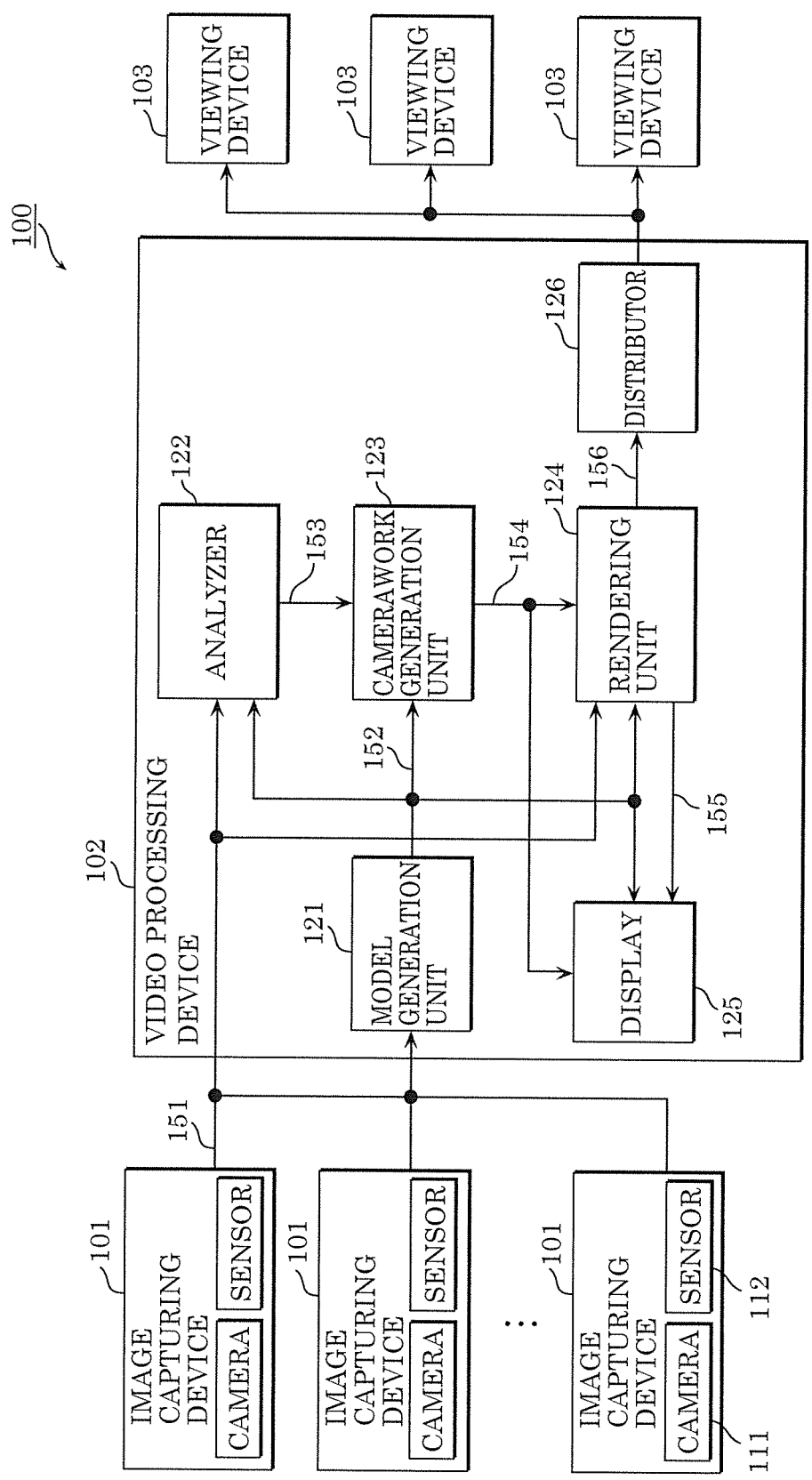
FIG. 1 is a block diagram of a video distribution system according to Embodiment 1.

Services for generating a free-viewpoint video from stationary scenes in a sport match or a live performance started to be in widespread use. In addition, opportunities to use a free-viewpoint video in which a viewpoint moves freely are expected to increase with respect to stationary scenes as well as captured scenes. The free-viewpoint video here refers to a video of a target scene viewed from a virtual camera moving between any spatial positions. To generate a free-viewpoint video, it is necessary to determine a camerawork that represents temporal changes in position and orientation of the virtual camera. Setting the camerawork has a high flexibility, thereby raising a problem in that it is difficult to set the camerawork appropriately.

In the present disclosure, a camerawork generating method for generating a camerawork automatically will be described.

A camerawork generating method according to an aspect of the present disclosure includes: generating, from a multi-view video of a same scene captured from different viewpoints, a three-dimensional model for the scene; determining a target scene which is included in the scene and is a target for which a free-viewpoint video of the three-dimensional model as viewed from a virtual camera is to be generated; and generating a camerawork representing a temporal change in a position and an orientation of the virtual camera in the free-viewpoint video.

According to this, the camerawork determining method enables the determination of a target scene that is a target for which to generate a free-viewpoint video and the generation of the camerawork for the determined target scene. The camerawork determining method therefore enables a camerawork to be determined appropriately. In addition, the camerawork determining method enables, for example, automatic determination of a camerawork, thereby saving an editor or the like time and effort.

For example, in the determining of the target scene, the target scene may be determined using one of the multi-view video and the three-dimensional model.

For example, in the determining of the target scene, the target scene may be determined using sound of the scene.

For example, in the generating of the camerawork, the position and the orientation of the virtual camera may be determined such that an object of a predetermined type associated with the target scene is included in the free-viewpoint video.

According to this, the camerawork determined by the camerawork determining method can be used to generate a free-viewpoint video in which an object of a type corresponding to the target scene is seen.

For example, in the generating of the camerawork, the position and the orientation of the virtual camera may be determined based on precisions of a plurality of portions included in the three-dimensional model.

According to this, the camerawork determined by the camerawork determining method can be used to generate a high-precision free-viewpoint video.

For example, the camerawork generating method may further include displaying the camerawork.

For example, the camerawork generating method may further include generating the free-viewpoint video from one of the three-dimensional model and the multi-view video, using the camerawork.

For example, in the generating of the free-viewpoint video, a shake may be added to the free-viewpoint video.

According to this, the camerawork determining method enables generation of a free-viewpoint video with a sense of realism.

For example, the camerawork generating method may further include acquiring an evaluation of the camerawork by a user, and in the generating of the camerawork, the camerawork may be generated based on the evaluation.

According to this, the camerawork determining method enables generation of a camerawork that matches preferences of a user.

A video processing device according to an aspect of the present disclosure includes: a model generation unit that generates, from a multi-view video of a same scene captured from different viewpoints, a three-dimensional model for the scene; an analyzer that determines a target scene which is included in the scene and is a target for which a free-viewpoint video of the three-dimensional model as viewed from a virtual camera is to be generated; and a camerawork generation unit that generates a camerawork representing a temporal change in a position and an orientation of the virtual camera in the free-viewpoint video.

According to this, the video processing device enables the determination of a target scene that is a target for which to generate a free-viewpoint video and the generation of the camerawork for the determined target scene. Therefore the video processing device can determine a camerawork appropriately. In addition, the video processing device enables, for example, automatic determination of a camerawork, thereby saving an editor or the like time and effort.

Note that these generic or specific aspects may be realized by a system, a method, an integrated circuit, a computer program, or a computer-readable recording medium such as a CD-ROM, or may be realized by any combination of a system, a method, an integrated circuit, a computer program, and a recording medium.

Hereinafter, embodiments will be specifically described with reference to the drawings. Note that each of the subsequently described embodiments indicates a specific example of the present disclosure. Numerical values, shapes, materials, components, the arrangement and connection of the components, steps, and the order of the steps indicated in the subsequent embodiments are examples and are not intended to limit the present disclosure. Furthermore, among the components in the subsequently described embodiments, components which are not recited in the independent claims indicating the broadest concepts are described as optional components.

Embodiment 1

FIG. 1 is a block diagram illustrating a configuration of video distribution system 100 according to the present embodiment. Video distribution system 100 is a system that generates a free-viewpoint video in a sport stadium, a live venue, or the like, and distributes the generated free-viewpoint video. Video distribution system 100 includes a plurality of image capturing devices 101, video processing device 102, and a plurality of viewing devices 103.

Image capturing devices 101 each include camera 111 and sensor 112. Camera 111 captures a video. Sensor 112 includes at least one of a vibration sensor, an acceleration sensor, a geomagnetic sensor, and a microphone and generates data on sensing a capturing environment. Image capturing devices 101 each may be a stationary camera or a mobile camera. The mobile camera may be, for example, a PTZ camera such as a CCD camera or a network camera, a wearable camera, or a camera mounted on a movable body such as a drone. By the plurality of image capturing devices 101, multi-view video 151 of the same scene captured from different viewpoints is generated. That is, multi-view video 151 includes a plurality of videos of the same scene captured from different viewpoints.

Video processing device 102 generates free-viewpoint video 156 using multi-view video 151 and distributes generated free-viewpoint video 156 to a plurality of viewing devices 103. Image capturing devices 101 each include model generation unit 121, analyzer 122, camerawork generation unit 123, rendering unit 124, display 125, and distributor 126.

Viewing devices 103 each play back and display a free-viewpoint video distributed from video processing device 102.

Video processing device 102 may be implemented by a single device or may be implemented by a plurality of devices capable of communicating with one another. For example, display 125 may be included in a device other than a device including the other processing units.

Figure 2:
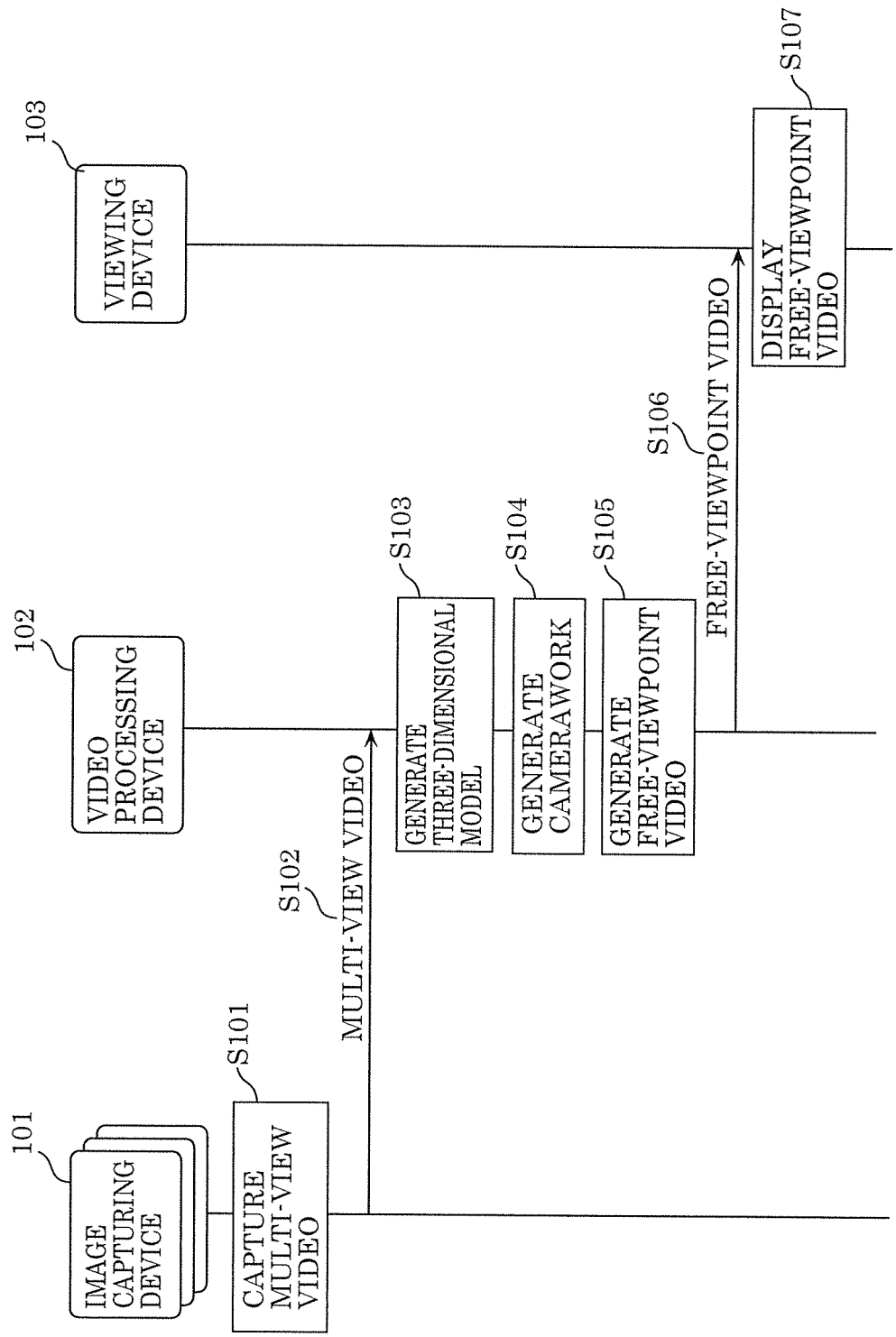
FIG. 2 is a diagram illustrating an example of how the video distribution system according to Embodiment 1 operates.
Figure 3:
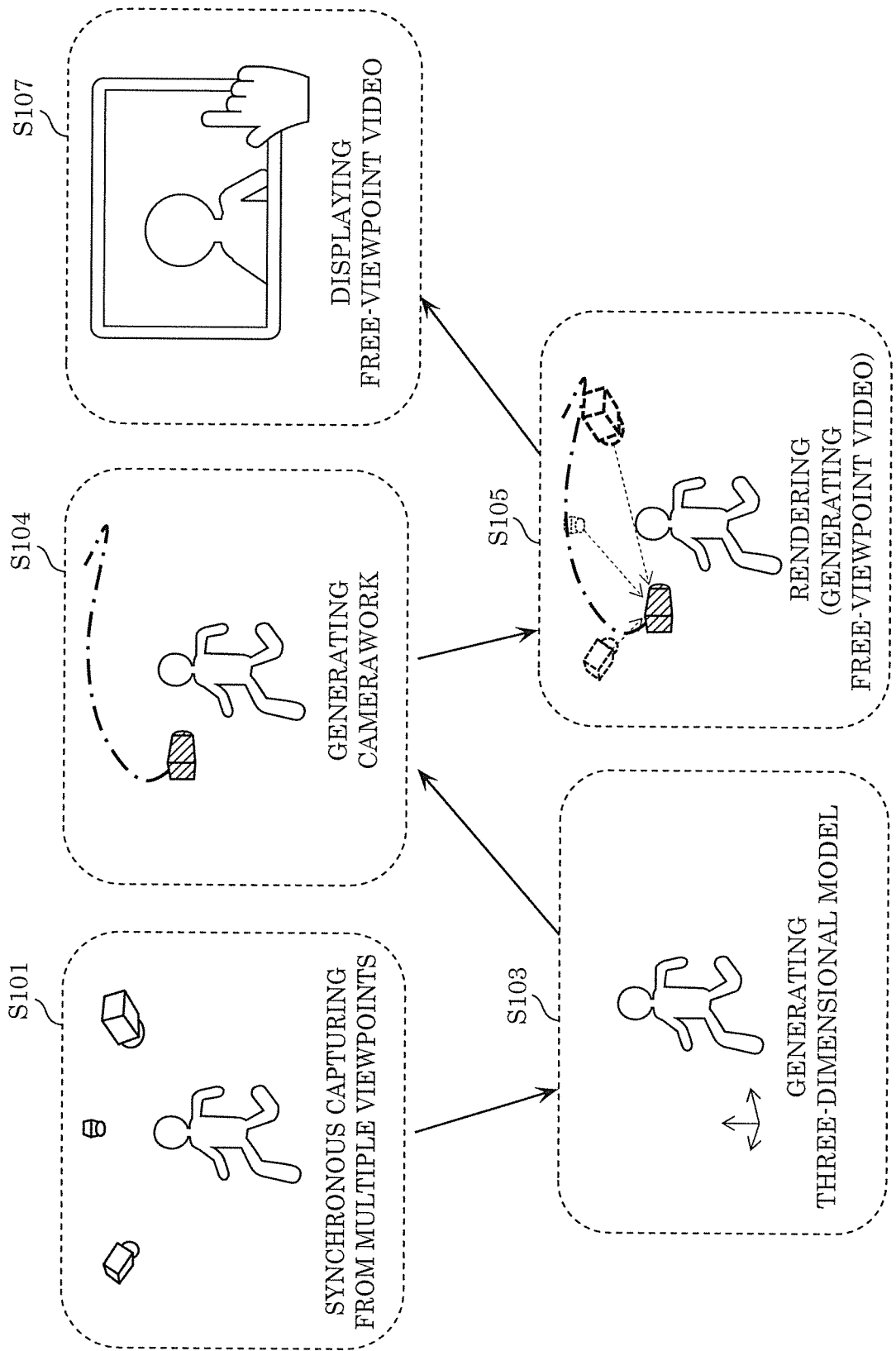
FIG. 3 is a diagram schematically illustrating how the video distribution system according to Embodiment 1 operates.

FIG. 2 is a diagram illustrating an example of how video distribution system 100 operates. FIG. 3 is a diagram illustrating operations schematically.

First, the plurality of image capturing devices 101 performs synchronous capturing to capture images (still images) or videos (motion videos) at the same time point (S101). For example, shutters of the plurality of image capturing devices 101 are released simultaneously under control of the plurality of image capturing devices 101 through wired or wireless connection. Alternatively, image capturing devices 101 may acquire videos captured with cameras 111 as well as acquire sensing data on a capturing environment acquired with sensors 112 simultaneously. For example, the sensing data contains at least one of vibration, acceleration, geomagnetism, and sound.

Next, the plurality of image capturing devices 101 transmits multi-view video 151 and the sensing data to video processing device 102 (S102).

Next, model generation unit 121 included in video processing device 102 uses multi-view video 151 and camera parameters of the plurality of image capturing devices 101 used to capture multi-view video 151 to generate three-dimensional model 152 of a capturing space (S103). Video processing device 102 may determine the camera parameters beforehand by calibration processing or may estimate the camera parameters from multi-view video 151 using Structure from Motion (SfM) or the like. Model generation unit 121 generates three-dimensional model 152 using, for example, visual cone intersection, SfM, or the like.

Next, camerawork generation unit 123 disposes a virtual camera in a three-dimensional space automatically and generates camerawork 154 used to generate a free-viewpoint video (S104). Specifically, when setting camerawork 154 automatically, camerawork generation unit 123 uses three-dimensional space recognition or the like to estimate a more appropriate orientation and setting of the camera, determining camerawork 154.

Next, rendering unit 124 generates free-viewpoint video 156 that is a video of three-dimensional model 152 viewed from the virtual camera using texture or color information on multi-view video 151 that is a video captured by actual cameras (S105). At that point, rendering unit 124 may preferentially select an actual camera to be used using a criterion of how close the actual camera is to a subject.

Next, distributor 126 distributes generated free-viewpoint video 156 to viewing devices 103 (S106). Viewing devices 103 then play back and display received free-viewpoint video 156 (S107).

Figure 4:
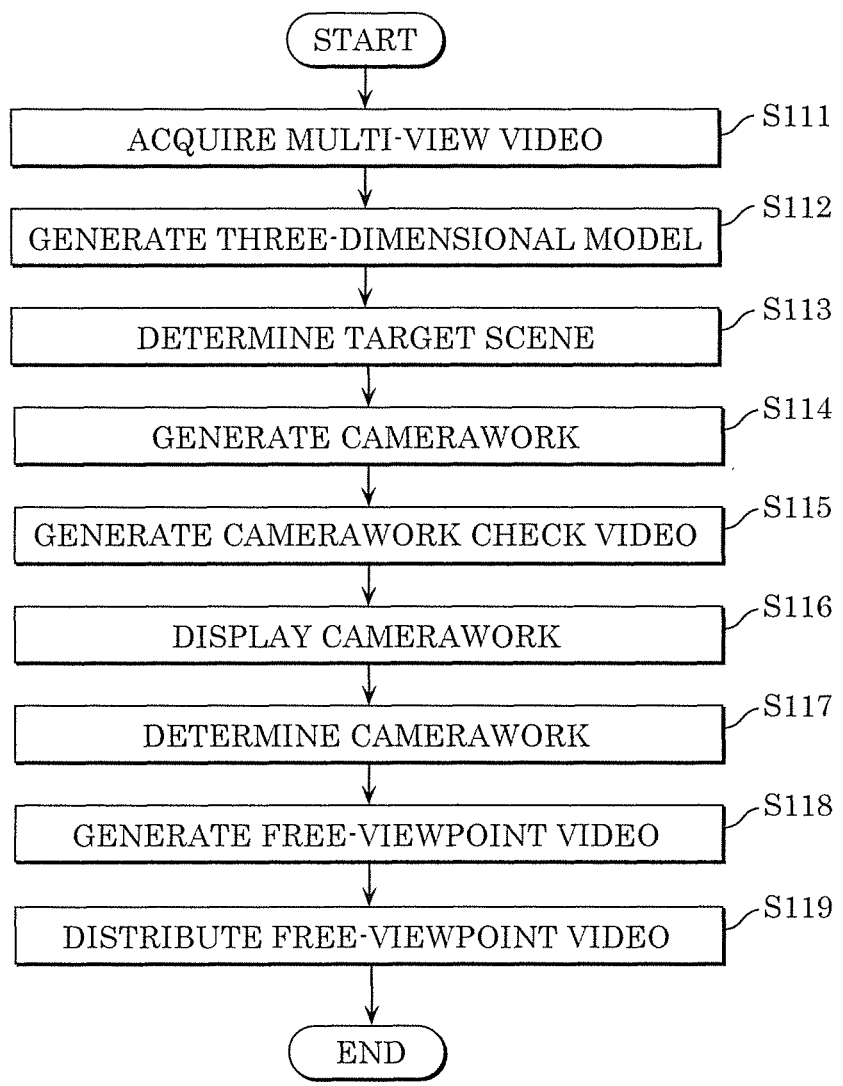
FIG. 4 is a flowchart illustrating an operation of the video processing device according to Embodiment 1.

Processing performed in video processing device 102 will be described below in detail. FIG. 4 is a flowchart of free-viewpoint video generating processing performed by video processing device 102.

First, video processing device 102 acquires multi-view video 151 (S111). Next, three-dimensional model generation unit 121 uses multi-view video 151 to generate three-dimensional model 152 of a target scene that is a capturing space (S112). At this point, it is sufficient that three-dimensional model 152 to be generated is spatial information generated from multi-view video 151 and supplementary information. Supplementary information refers to, for example, positional information on the plurality of cameras 111. Specifically, three-dimensional model generation unit 121 acquires the positional information on the plurality of cameras 111 by measuring positions of the plurality of cameras 111 in the three-dimensional space beforehand. Alternatively, three-dimensional model generation unit 121 acquires the positional information on the plurality of cameras 111 by performing calibration processing through image processing. Next, three-dimensional model generation unit 121 uses the acquired positional information on the plurality of cameras 111 to perform visual cone intersection or the like, generating voxel data.

Alternatively, three-dimensional model generation unit 121 uses feature point information that is information on an edge or a corner on each image to estimate a point common to images (feature point position). Three-dimensional model generation unit 121 uses the feature point position and a method for estimating three-dimensional information on camera orientation such as SfM, so as to generate three-dimensional point group.

Next, analyzer 122 uses at least one of multi-view video 151 and three-dimensional model 152 to determine target scene 153 that is a target for which to generate free-viewpoint video 156 (S113). Specifically, analyzer 122 performs recognition processing on multi-view video 151 and three-dimensional model 152 to determine target scene 153. More specifically, analyzer 122 determines a generation trigger and an end trigger of the camerawork; the generation trigger indicates a start of target scene 153, and the end trigger indicates an end of target scene 153. Target scene 153 may be either a still scene or a motion scene. That is, the target scene may be either on a time point basis or on a time range basis.

In addition, analyzer 122 generates auxiliary information. The auxiliary information refers here to information obtained through image recognition, which is recognition result information to be necessary in generation of a camerawork. For example, the auxiliary information is information indicating a type and a position of an object, person, or the like in a video, information indicating whether a current scene is a predetermined, specific scene, or information indicating a type of the current scene. Specifically, the auxiliary information indicates a three-dimensional position (e.g., three-dimensional coordinates) of a specific person in a video. Alternatively, the auxiliary information indicates whether the current scene is a scene of shot, or the like.

For example, analyzer 122 performs image recognition or the like to detect a highlight scene such as a goal scene. Alternatively, analyzer 122 detects a distinctive pose of an official (e.g., a pose of a baseball umpire to call an out, a pose of holding one of cards in the air in soccer game, etc.) and determines scenes before and after a time point of detection of the pose to be the specific scene. In addition, analyzer 122 detects three-dimensional coordinate information and the like on a noticed object such as a specific person or a ball. Such detected information is output as the auxiliary information.

Analyzer 122 may output the auxiliary information that contains information indicating all of recognized persons or information on persons satisfying a condition from the recognized persons. The person satisfying a condition refers, for example, to a person who stops suddenly, a person who makes a suspicious action, a person who enters a specific area, or the like. This enables processing to be performed on a suspicious character out of the recognized persons for a surveillance purpose or the like, reducing computational resources and an amount of data.

In addition, analyzer 122 may perform video processing retroactively based on a result of analyzing scenes. That is, when detecting a specific scene, analyzer 122 may determine the specific scene and a scene immediately before the specific scene to be target scene 153. For example, when detecting a scene of shot, analyzer 122 may determine a series of scenes including the scene of shot and a scene immediately before the scene of shot to be target scene 153.

Analyzer 122 may determine target scene 153 using, in addition to the videos, the sensing data acquired by sensors 112 of image capturing devices 101. For example, analyzer 122 may determine the target scene using sound obtained with a microphone. Specifically, in a case where there is a scene a sound volume of which is equal to or higher than a predetermined value, analyzer 122 may determine the scene or scenes before and after the scene as the target scene. Analyzer 122 may use a volume of a sound with a specific frequency for the determination or may use a duration of a sound for the determination. This enables analyzer 122 to determine a scene with a raised voltage, a scene with an explicit audio signal such as a whistle, a scene with an emergency sound (sound of explosion, warning sound, etc.) to be the target scene.

Next, camerawork generation unit 123 uses information and auxiliary information on target scene 153 output from analyzer 122 to generate one or more cameraworks 154 automatically (S114). In addition to the above kinds of information, camerawork generation unit 123 may use information that is manually input to generate camerawork 154.

Specifically, camerawork generation unit 123 generates camerawork 154 automatically according to a type of a scene indicated by the auxiliary information and a status of a subject. For example, camerawork generation unit 123 determines the position and orientation of the virtual camera such that an object of a predetermined type associated with the target scene is included in free-viewpoint video 156. For example, camerawork generation unit 123 determines the position and orientation of the camera such that a goal can be seen in a video in a case of a scene of shot in a soccer game. Alternatively, camerawork generation unit 123 determines the position and orientation of the camera such that a noticed person such as a noticed player can be seen in a video. Alternatively, camerawork generation unit 123 may determine the position and orientation of the camera such that an area ahead of the noticed player can be seen more widely than the other area. In such a manner, camerawork generation unit 123 sets the position and orientation of the camera according to what the scene means. The viewpoint need not move always seamlessly, and like switching, the viewpoint may be switched discretely.

In a case where the auxiliary information indicates a logotype of a sponsor, camerawork generation unit 123 may determine the camerawork such that the logotype can be seen often.

Camerawork generation unit 123 may determine a region three-dimensional model 152 of which is not generated or a region of a low quality and select camerawork 154 such that such regions are not included in a video. That is, camerawork generation unit 123 may determine the position and orientation of the virtual camera based on precisions of a plurality of portions included in three-dimensional model 152.

Rather than generating camerawork 154 for a target scene after determining the target scene, camerawork generation unit 123 may generate camerawork 154 all the time and output camerawork 154 for a target scene after determining the target scene. This reduces a waiting time for the processing, allowing a viewer to be provided with a video immediately.

In addition, camerawork generation unit 123 may fail to generate a camerawork intentionally. For example, in a case where a target object such as a ball or a noticed player is tracked, when a moving direction of the target object changes greatly, a camerawork may be set so as to cause an overshoot in which a viewpoint goes past the target object once. This enables generation of free-viewpoint video 156 with a sense of realism as if the free-viewpoint video is captured by an actual camera.

Next, rendering unit 124 uses multi-view video 151, three-dimensional model 152, and camerawork 154 to generate camerawork check video 155 (S115). Camerawork check video 155 may be, for example, an image generated from three-dimensional model 152 in a simple manner. For example, camerawork check video 155 may be generated in a speed-oriented manner into a low-quality video or a low-resolution video as compared to free-viewpoint video 156 to be described later, or may be generated from point group data. In a case where a rendering speed is sufficiently high, a video having the same quality as that of free-viewpoint video 156 to be described later may be generated as camerawork check video 155.

Figure 5:
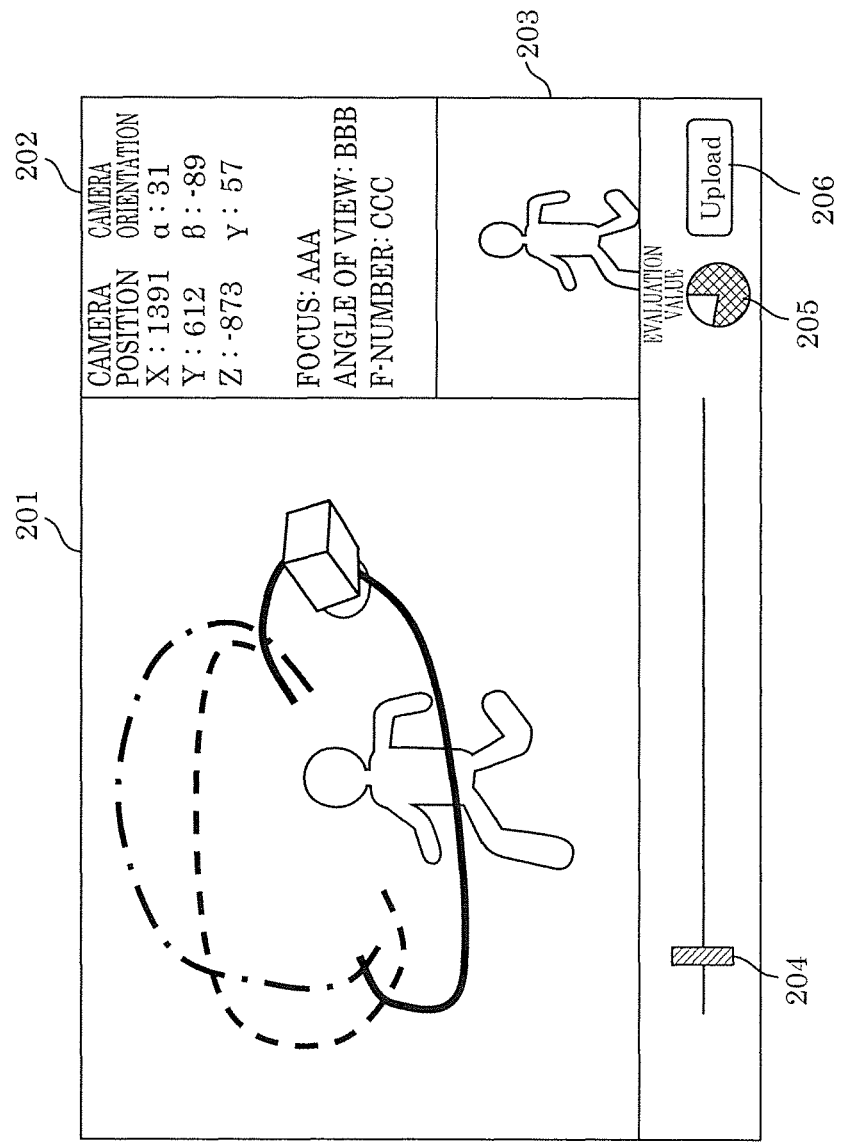
FIG. 5 is a diagram illustrating an example of an interface screen according to Embodiment 1.

Next, display 125 displays an interface screen for checking three-dimensional model 152, camerawork 154, and camerawork check video 155 (S116). FIG. 5 is a diagram illustrating an example of the interface screen. The interface screen includes camerawork display field 201, camera information display field 202, camerawork check video display field 203, slide bar 204, evaluation display field 205, and upload button 206.

In camerawork display field 201, three-dimensional model 152 and a camera path that is a path of camerawork 154 are displayed. There may be one camera path displayed or a plurality of candidates for a camera path displayed. In addition, colors and line types may be applied to the plurality of camera paths to represent information such as recommendation levels of the respective camera paths. Here, the recommendation levels each indicate a degree of match between the recommendation level and a preference of a user or a degree of viewing frequency. Displaying the plurality of camera paths can provide choices to a user (viewer) or an editor.

Although FIG. 5 illustrates the camera paths for one target object, the camera paths may be displayed for each of a plurality of target objects. The plurality of camera paths may be selected in order, and corresponding camerawork check videos 155 may be played back consecutively in order of the selection.

In camerawork check video display field 203, camerawork check video 155 corresponding to a camerawork is displayed for checking.

Slide bar 204 is used to operate a time point in camerawork check video 155. For example, when an editor operates slide bar 204, a virtual camera moves on a camera path, and camerawork check video 155 corresponding to an operated time point is displayed in camerawork check video display field 203. Alternatively, a playback may be started automatically as a camera path is selected, and slide bar 204 may be moved. In addition, operating buttons or an operation menu to play back a camerawork may be provided.

In camera information display field 202, the position and orientation of the camera corresponding to a time point and camera parameters including a focal distance, an angle of view, and an F-number, and the like are displayed. The position and orientation of the camera and the camera parameters can be edited by an editor. This enables the editor to modify camerawork 154 generated by camerawork generation unit 123 according to a preference of the editor. In place of the camera parameters, an interface on which to select a type of a camera may be provided. When an editor selects a type of a camera, camera parameters and the like of the selected camera are set automatically. This enables playback of a video as if the video is captured by the selected camera.

Video processing device 102 may have a function of giving a feedback on results of the selection, details of the modification, and proposition that are made by an editor. For example, when upload button 206 is operated, camerawork generation unit 123 is notified of a camerawork modified by an editor. The notified information is used, for example, in machine learning as references relating to generation of a camera path or camerawork 154.

In evaluation display field 205, an evaluation value such as a recommendation level or the like of selected camerawork 154 is displayed. A field that allows an editor to input an evaluation value of camerawork 154 may be provided. In this case, the input evaluation value is notified to camerawork generation unit 123, and an evaluation value of camerawork 154 in question is updated. The evaluation value may be used for the machine learning.

For example, in a live performance, a plurality of cameraworks 154 (or camerawork check videos 155) is displayed to an editor. The editor selects some of a plurality of cameraworks 154, and evaluation values of some cameraworks 154 are then calculated according to a result of the selection or the like. These evaluation values are then used to create a non-realtime replay video such as a broadcasting material. That is, camerawork 154 with a high evaluation is preferentially created and displayed. The evaluation values may be set on an individual basis or may reflect a result of evaluation made by a plurality of persons.

An interface to set a filtering effect may be provided.

In such a manner, by a selection or an edition made by an editor, camerawork 154 used for free-viewpoint video 156 to be distributed is determined (S117). For example, when upload button 206 is operated by an editor, edited camerawork 154 is transmitted to rendering unit 124. Rendering unit 124 generates free-viewpoint video 156 corresponding to this camerawork 154 (S118). In a case where a plurality of cameraworks 154 is selected, rendering unit 124 generates a plurality of free-viewpoint videos 156.

At this point, rendering unit 124 may determine a region three-dimensional model 152 of which is not generated, a region of a low quality, or a region difficult to reproduce, such as a surface of water, and interpolate these regions using CG or the like. Alternatively, rendering unit 124 may interpolate images of such regions by using information on frames of different time points (e.g., a result of rendering performed at several seconds ago). Such kinds of processing for interpolation enable a natural free-viewpoint video 156 to be created even for a region with little information on three-dimensional model 152. In a case where there is a region difficult to reproduce, rendering unit 124 controls image capturing devices 101 such as mobile cameras to acquire video data and the like used to generate the region.

Alternatively, rendering unit 124 may control an unsharpness of a rendering result according to a camera speed (moving speed of a viewpoint). For example, rendering unit 124 may make a region corresponding to a surrounding visual field (e.g., surrounding region of an image) unsharp according to the speed. Specifically, rendering unit 124 performs processing in which the unsharpness is increased with an increase in the speed. This enables the generated video to be closer to a video that is actually seen by a human. This enables a viewer to obtain a high sense of realism (particularly when experiencing virtual reality).

Alternatively, rendering unit 124 may perform rendering ignoring a three-dimensional model belonging to an unnecessary object in a video (e.g., a wire net for security, etc.). For example, analyzer 122 distinguishes the unnecessary object in a video.

Alternatively, rendering unit 124 may perform rendering processing without using three-dimensional model 152, as in view morphing. This allows rendering unit 124 to perform the processing not using three-dimensional model 152 but using multi-view video 151, which is a two-dimensional image, reducing a load of processing.

In addition, in a case where there is sound information, rendering unit 124 may estimate a position of a sound source and use a result of the estimation to perform sound processing or sound synthesis that leads to improvement of a sense of realism. In addition, rendering unit 124 may play back sounds recorded by image capturing devices 101 for original camera videos and may use or add a sound that is recorded beforehand or sound effects for a video at a position of the virtual camera.

Rendering unit 124 may control sounds according to the orientation and position of the virtual camera. For example, rendering unit 124 may play back sounds at the position of the virtual camera based on a result of estimating the position of a sound source.

In addition, rendering unit 124 may apply a visual effect or an effect that is brought about by capturing by an actual cameraperson to improve reality.

For example, rendering unit 124 adds a camera shake. Specifically, rendering unit 124 adds a camera shake using a result of detecting a vibration occurring in a stadium, a result of detecting a shake of a camera, a result of detecting cheers, or the like. Specifically, rendering unit 124 increases the shake as a degree of the vibration occurring in a stadium, a degree of the shake of a camera, or a degree of the cheers increases. These results of detection are, for example, results of detection obtained by sensors 112. Alternatively, rendering unit 124 may detect these results from multi-view video 151.

Alternatively, rendering unit 124 may add a camera shake according to the moving speed of a viewpoint. Specifically, rendering unit 124 increases the shake as the moving speed of a viewpoint increases.

In a case where a video having the same quality as free-viewpoint video 156 is generated as camerawork check video 155, camerawork check video 155 unchanged may be used as free-viewpoint video 156.

Next, distributor 126 distributes one or more free-viewpoint videos 156 generated by rendering unit 124 to viewing devices 103 (S119). At this point, distributor 126 may distribute, in addition to free-viewpoint videos 156, at least one of three-dimensional model 152, information indicating a viewpoint (the position of the virtual camera), and camerawork 154 to viewing devices 103.

Viewing devices 103 each display free-viewpoint videos 156 distributed. In addition, when receiving three-dimensional model 152, the information indicating the viewpoint, or camerawork 154, viewing devices 103 each may display these kinds of information. Alternatively, viewing devices 103 each may generate an image or CG from three-dimensional model 152 and display the generated image or CG. In addition, in a case where viewing devices 103 are to receive a plurality of free-viewpoint videos 156, viewing devices 103 may include an interface for switching free-viewpoint video 156 to display from the received plurality of free-viewpoint video 156.

In addition, viewing devices 103 may include an interface for acquiring an evaluation value of free-viewpoint video 156 or camerawork 154 given by a viewer. The acquired evaluation value is transmitted to camerawork generation unit 123 and, as with the evaluation made by an editor, used for generation of camerawork 154 to be performed afterward. That is, video distribution system 100 acquires an evaluation of camerawork 154 made by a user (editor or viewer) and generates camerawork 154 based on the evaluation.

In the above description, an example in which video processing device 102 has a function that allows an editor to edit camerawork 154 generated by camerawork generation unit 123 is described, but note that the present embodiment is not limited to such. For example, an editor may select a given number of cameraworks 154 from a plurality of cameraworks 154. In this case, rendering unit 124 generates free-viewpoint videos 156 corresponding to cameraworks 154 selected.

The intervention of an editor is not necessarily needed, and the entire processing may be performed automatically. That is, steps S115 to S117 illustrated in FIG. 4 may be skipped, and free-viewpoint video 156 corresponding to camerawork 154 generated by camerawork generation unit 123 may be distributed to viewing devices 103.

Variation of Embodiment 1

In the above description, an example in which camerawork 154 is selected or modified by an editor operating display 125 is described, but video distribution system 100 may have, in addition to the above-described function, a function that allows a viewer operating viewing device 103A to edit camerawork 154.

Figure 6:
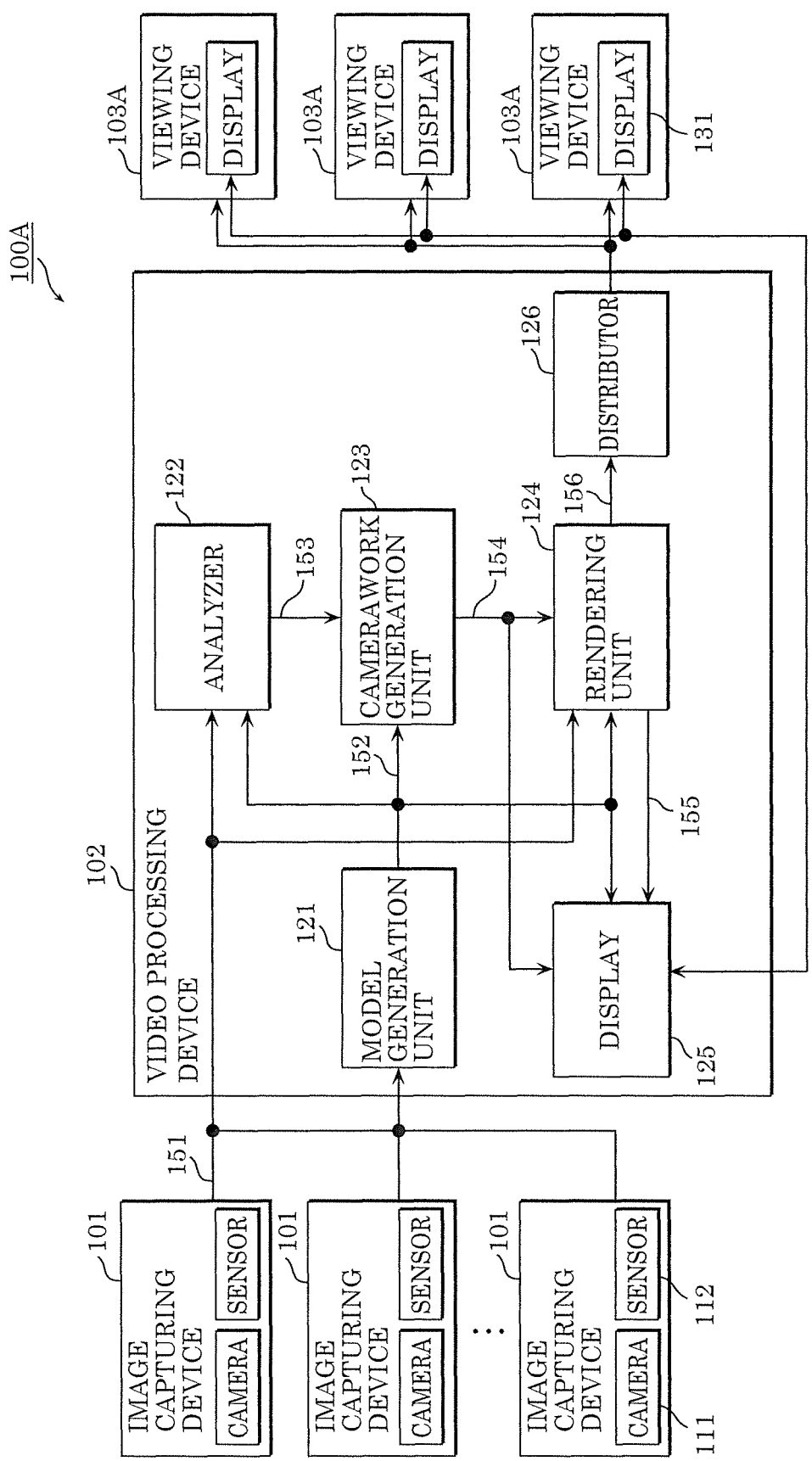
FIG. 6 is a block diagram of a video distribution system according to a variation of Embodiment 1.

FIG. 6 is a block diagram illustrating a configuration of video distribution system 100A according to the present variation. In the present variation, viewing device 103A includes display 131 having the same function as display 125. This enables the same display and operation as display 125 to be performed using viewing device 103A. This allows a viewer to control camerawork 154.

For example, display 131 acquires the same information as the information input to display 125, through communication. As with display 125, display 131 gives video processing device 102 a feedback such as modified camerawork 154, a result of selecting camerawork 154, or an evaluation value, through communication.

In addition, there may be a mechanism in which a viewer or editor provides other persons with newly created camerawork 154 via SNS or the like. In this case, video processing device 102 acquires excellent camerawork 154 based on downloads or a popularity of provided camerawork 154 and uses information on acquired camerawork 154 for generation of subsequent camerawork 154. For example, acquired camerawork 154 is used as references for machine learning.

In addition, a screen shot of a screen displayed on display 125 or the like may be transmitted to viewing device 103A as appropriate in response to an interactive operation from viewing device 103A. This transmits information on the screen only, enabling reduction of an amount of transmitted information.

Embodiment 2

Figure 7:
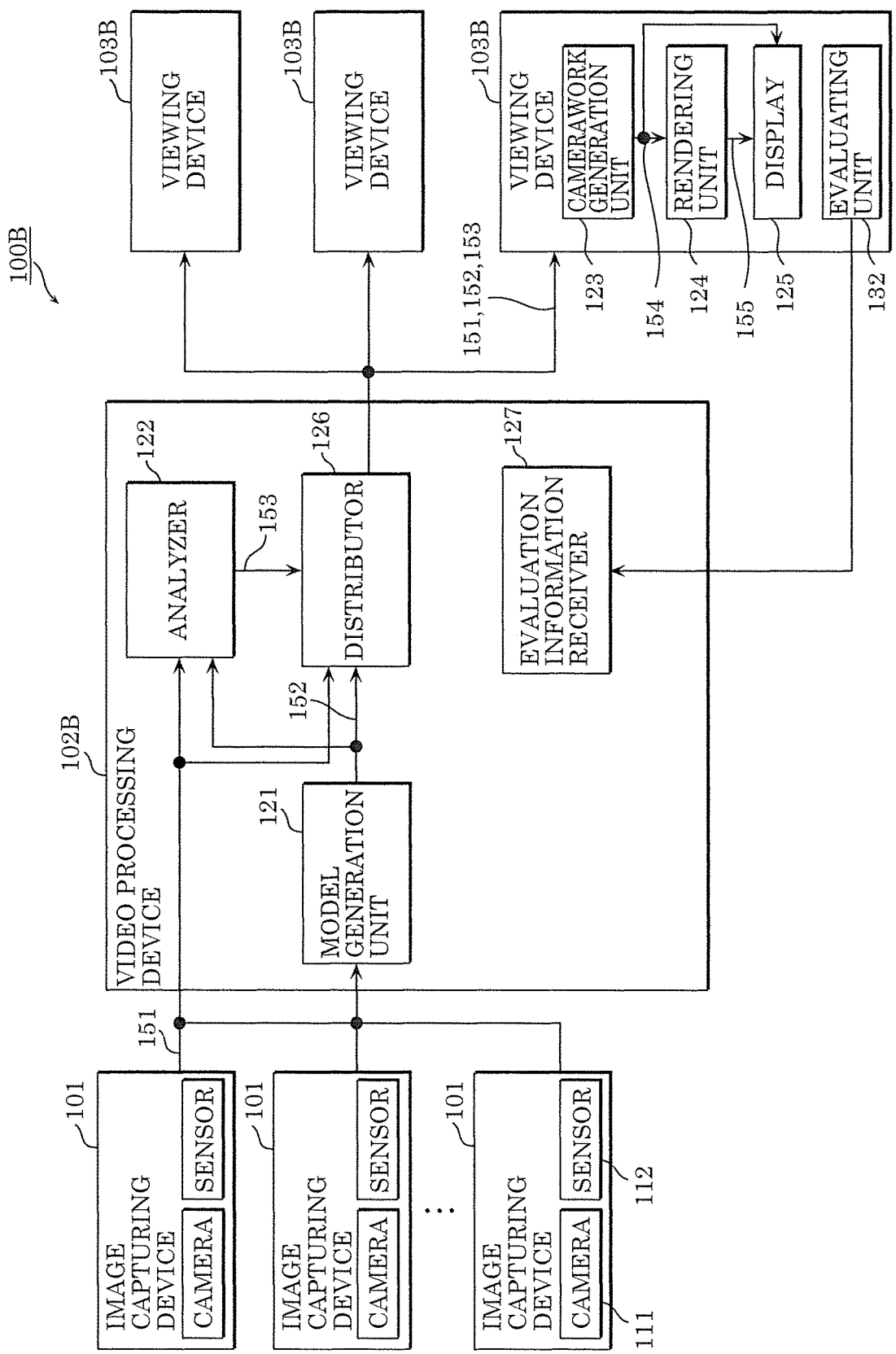
FIG. 7 is a block diagram of a video distribution system according to Embodiment 2.

In the present embodiment, an example in which viewing devices 103 have some of the functions of video processing device 102 will be described. FIG. 7 is a block diagram illustrating a configuration of video distribution system 100B according to the present embodiment. In video distribution system 100B illustrated in FIG. 7, video processing device 102B does not include camerawork generation unit 123, rendering unit 124, and display 125. Meanwhile, video processing device 102B includes evaluation information receiver 127.

Distributor 126 distributes information indicating multi-view video 151, three-dimensional model 152, and target scene 153, auxiliary information, and the like to viewing devices 103B.

Viewing devices 103B each include camerawork generation unit 123, rendering unit 124, display 125, and evaluating unit 132. The functions of camerawork generation unit 123, rendering unit 124, and display 125 are the same as those described in Embodiment 1.

Evaluating unit 132 transmits an evaluation value of camerawork 154 or camerawork check video 155, details of modification of camerawork 154, or the like obtained by display 125 using the same method as in Embodiment 1 to video processing device 102B.

Evaluation information receiver 127 receives information transmitted by evaluating unit 132. The transmission of the information may be performed via SNS or the like, as described above.

This enables video processing device 102B on a distributor side to acquire information on a viewer's taste or the like. Video processing device 102B can thereby transmit information necessary to generate camerawork 154 that matches the information on a viewer's taste (information indicating target scene 153 and auxiliary information, etc.) to viewing devices 103B.

Although the example in which video processing device 102B does not include camerawork generation unit 123, rendering unit 124, and display 125 is described here, note that video processing device 102B may include camerawork generation unit 123, rendering unit 124, and display 125 as in Embodiment 1. In addition, distributor 126 may distribute free-viewpoint video 156 to viewing devices 103B. This case enables both of video processing device 102B and viewing devices 103B to modify camerawork 154. Camerawork 154 once modified by an editor can thereby be modified again by a viewer, which can reduce operations by the viewer and allows each viewer to view a video that matches the each viewer's taste.

In this case, the information received by evaluation information receiver 127 is used as, for example, learning data for automatic generation of camerawork 154 by machine learning or the like.

Note that separation of processing among a plurality of devices described in the above plurality of embodiments is an example and not limited to the above. For example, processing up to the generation of three-dimensional model 152 may be performed by video processing device 102B, multi-view video 151 and three-dimensional model 152 may be transmitted to viewing devices 103B, and viewing devices 103B may perform the rest of the processing. That is, viewing devices 103B each may further include analyzer 122.

Video distribution systems and the like according to embodiments are described above, but the present disclosure is not limited to these embodiments.

For example, the present disclosure may be implemented in a form of a video distribution method, a video processing method, a camerawork generating method, and the like performed in the above video distribution system.

Each processing unit included in each apparatus included in the video distribution system according to the embodiments is achieved through large-scale integration (LSI), which is typically embodied as an integrated circuit. Each processing unit may be realized as a chip, or some or all of the processing units may be realized as a chip.

An integrated circuit need not be obtained through LSI, but may be a dedicated circuit or a general-purpose processor. A field-programmable gate array (FPGA) for which programming can be performed after an LSI circuit is fabricated or a reconfigurable processor capable of reconfiguring connections and settings of circuit cells of an LSI circuit may be used, instead.

In the above embodiments, each component may be achieved by dedicated hardware or a software program suitable for each component. Each component may be achieved by a program execution unit such as a central processing unit (CPU) or a processor that reads and executes a software program stored in a storage medium such as a hard disk or a semiconductor memory, instead.

In other words, each apparatus included in the video distribution system or the video display device includes processing circuitry and a storage (can be accessed from the processing circuitry) electrically connected to the processing circuitry. The processing circuitry includes at least either dedicated hardware or a program execution unit. If the processing circuitry includes a program execution unit, the storage is used for storing a software program executed by the program execution unit. The processing circuitry executes the method for selecting cameras or the video display method according to the embodiments using the storage.

Furthermore, the present disclosure may be implemented as the software program or a non-transitory computer-readable storage medium storing the software program. The software program can obviously be distributed through a communication medium such as the Internet.

Numbers in the above description are examples used for specifically describing the present disclosure, and the present disclosure is not limited by such numbers.

The order of steps indicated in the flowcharts, etc., are examples used for specifically describing the present disclosure, and the order of the steps may be different from that described above. Some of the steps may be performed at the same time as (in parallel with) other steps.

Although the video distribution system, etc., according to one or a plurality of aspects of the present disclosure have been described on the basis of the embodiments, the present disclosure is not limited to the embodiments. Modes obtained by modifying the embodiment in various ways that can be conceived those skilled in the art and modes obtained by combining components described in different embodiments may be included in the one or plurality of aspects of the present disclosure insofar as the scope of the present disclosure is not deviated from.

Embodiment 3

Other application examples of the configurations of the image processing method and apparatus described in each embodiment described above and a system using the application examples will be described. The system is applicable to an increasingly intelligent video system with object space extending to a wider area. For example, the system is applicable to (1) a monitoring system mounted in a security camera of a store or a factory, a vehicle-mounted camera of the police or the like, (2) a transportation information system using a camera owned by an individual person, each vehicle-mounted camera, a camera installed in a road or the like, (3) an environmental research or delivery system using a remote-controllable or auto-controllable apparatus such as a drone, and (4) a content transmission and reception system of a video or the like using a camera installed in an entertainment facility, a stadium or the like, a moving camera such as a drone, a camera owned by an individual person or the like.

Figure 8:
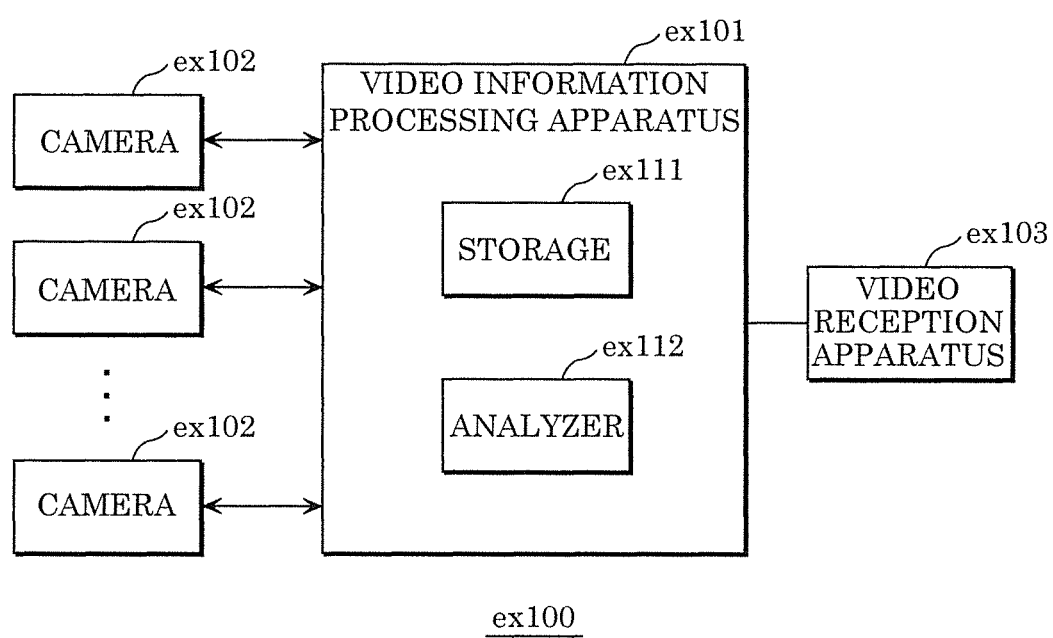
FIG. 8 is a diagram illustrating a configuration of a video information processing system.

FIG. 8 is a diagram illustrating a configuration of video information processing system ex100 according to the present embodiment. The present embodiment describes an example of preventing occurrence of a blind spot and an example of prohibiting capturing of a specific area.

Video information processing system ex100 illustrated in FIG. 8 includes video information processing apparatus ex101, a plurality of cameras ex102, and video reception apparatus ex103. Note that video information processing system ex100 does not necessarily need to include video reception apparatus ex103.

Video information processing apparatus ex101 includes storage ex111 and analyzer ex112. Each of N cameras ex102 has a function of capturing videos and a function of transmitting captured video data to video information processing apparatus ex101. Moreover, camera ex102 may have a function of displaying a video that is being captured. Note that camera ex102 may code a captured video signal by using a coding scheme such as HEVC or H.264, and may then transmit the coded video signal to video information processing apparatus ex101, or camera ex102 may transmit the video data that is not coded to video information processing apparatus ex101.

Here, each camera ex102 is a fixed camera such as a monitoring camera, a moving camera mounted in a radio-controlled unmanned flight vehicle, a vehicle or the like, or a user camera owned by a user.

The moving camera receives an instruction signal transmitted from video information processing apparatus ex101, and changes a position or capturing direction of the moving camera itself in response to the received instruction signal.

Moreover, time of the plurality of cameras ex102 is calibrated by using time information of a server or a reference camera prior to start of capturing. Moreover, spatial positions of the plurality of cameras ex102 are calibrated based on how an object in space to be captured is captured or a relative position from a reference camera.

Storage ex111 in information processing apparatus ex101 stores the video data transmitted from N cameras ex102.

Analyzer ex112 detects a blind spot from the video data stored in storage ex111, and transmits to the moving camera the instruction signal that indicates an instruction to the moving camera for preventing occurrence of a blind spot. The moving camera moves in response to the instruction signal, and continues capturing.

Analyzer ex112 detects a blind spot by using Structure from Motion (SfM), for example. SfM is a technique of restoring a three-dimensional shape of a subject from a plurality of videos captured from different positions, and SfM is widely known as a shape restoration technology of estimating a subject shape and a camera position simultaneously. For example, analyzer ex112 restores the three-dimensional shape in the facility or in the stadium from the video data stored in storage ex111 by using SfM, and detects as a blind spot an area that cannot be restored.

Note that when the position and capturing direction of camera ex102 are fixed and information of the position and capturing direction is known, analyzer ex112 may perform SfM by using these pieces of known information. Moreover, when the position and capturing direction of the moving camera can be acquired with, for example, a GPS and angle sensor in the moving camera, the moving camera may transmit information of the position and capturing direction of the moving camera to analyzer ex112, and analyzer ex112 may perform SfM by using the transmitted information of the position and the capturing direction.

Note that a method for detecting a blind spot is not limited to the above-described method using SfM. For example, analyzer ex112 may use information from a depth sensor such as a laser range finder, to know a spatial distance of the object to be captured. Moreover, when an image includes a marker that is set in space in advance or a specific object, analyzer ex112 may detect information of the camera position, capturing direction, and zoom magnification from the size of the marker or the object. Thus, analyzer ex112 detects a blind spot by using any method that enables detection of the capturing area of each camera. Moreover, analyzer ex112 may acquire, for example, information of a mutual positional relationship between a plurality of objects to be captured, from video data or a proximity sensor, and analyzer ex112 may identify an area where a blind spot is highly likely to occur, based on the acquired positional relationship.

Here, the blind spot includes not only a portion having no video in an area to be captured but also a portion having poor image quality as compared to other portions, and a portion having no predetermined image quality. This portion to be detected may be set appropriately according to the configuration or purpose of the system. For example, required image quality of a specific subject in space to be captured may be set high. Moreover, conversely, the required image quality of a specific area in space to be captured may be set low, and the required image quality may be set such that the area is not determined to be a blind spot even when no video is captured.

Note that the above-described image quality includes various pieces of information regarding a video, such as area occupied by a subject to be captured in the video (for example, a number of pixels), or whether the video is focused on the subject to be captured. Based on these pieces of information or combination thereof, whether the area is a blind spot may be determined.

Note that detection of the area that is actually a blind spot is described above, but the area that needs to be detected in order to prevent occurrence of a blind spot is not limited to the area that is actually a blind spot. For example, when a plurality of objects to be captured exists and at least part of the objects is moving, a new blind spot is likely to occur because another object to be captured enters between a certain object to be captured and a camera. Meanwhile, analyzer ex112 may detect movement of the plurality of objects to be captured from, for example, the captured video data, and analyzer ex112 may estimate the area that is likely to become a new blind spot, based on the detected movement of the plurality of objects to be captured and positional information of camera ex102. In this case, video information processing apparatus ex101 may transmit the instruction signal to the moving camera to capture the area that is likely to become a blind spot, and video information processing apparatus ex101 may prevent occurrence of a blind spot.

Note that when there is a plurality of moving cameras, video information processing apparatus ex101 needs to select any of the moving cameras to which the instruction signal is to be transmitted in order to cause the moving camera to capture a blind spot or an area that is likely to become a blind spot. Moreover, when there is a plurality of moving cameras and there is a plurality of blind spots or areas that are likely to become blind spots, video information processing apparatus ex101 needs to determine which blind spot or area that is likely to become a blind spot each of the plurality of moving cameras is to capture. For example, video information processing apparatus ex101 selects the moving camera closest to a blind spot or an area that is likely to become a blind spot, based on a position of a blind spot or an area that is likely to become a blind spot, and a position of an area each moving camera is capturing. Moreover, video information processing apparatus ex101 may determine for each camera whether a new blind spot occurs when video data which the moving camera is currently capturing is not obtained, and video information processing apparatus ex101 may select the moving camera that is determined that a blind spot does not occur even when the video data which is currently being captured is not obtained.

The above-described configuration enables video information processing apparatus ex101 to prevent occurrence of a blind spot by detecting a blind spot and transmitting the instruction signal to the moving camera so as to prevent the blind spot.

Variation 1

Note that the example of transmitting the instruction signal for instructing the moving camera to move is described above; however, the instruction signal may be a signal for instructing the user of the user camera to move. For example, the user camera displays an instruction image that instructs the user to change the direction of the camera, based on the instruction signal. Note that the user camera may display the instruction image that indicates a movement path on a map, as the user movement instruction. Moreover, in order to improve the quality of the acquired image, the user camera may display detailed capturing instructions such as the capturing direction, an angle, an angle of view, image quality, and movement of the capturing area. Further, video information processing apparatus ex101 may automatically control such feature data of camera ex102 regarding capturing when the feature data is controllable on a video information processing apparatus ex101 side.

Here, the user camera is, for example, a smartphone, a tablet terminal, a wearable terminal, or a head mounted display (HMD) that a spectator in the stadium or a guard in the facility carries.

Moreover, a display terminal that displays the instruction image does not need to be identical to the user camera that captures video data. For example, the user camera may transmit the instruction signal or the instruction image to the display terminal associated with the user camera in advance, and the display terminal may display the instruction image. Moreover, information of the display terminal corresponding to the user camera may be registered in video information processing apparatus ex101 in advance. In this case, video information processing apparatus ex101 may cause the display terminal to display the instruction image by transmitting the instruction signal directly to the display terminal corresponding to the user camera.

Variation 2

Analyzer ex112 may generate a free viewpoint video (three-dimensional reconfiguration data), for example, by using SfM to restore the three-dimensional shape in the facility or in the stadium from the video data stored in storage ex111. This free viewpoint video is stored in storage ex111. Video information processing apparatus ex101 reads from storage ex111 the video data according to visual field information (and/or viewpoint information) transmitted from video reception apparatus ex103, and transmits the read video data to video reception apparatus ex103. Note that video reception apparatus ex103 may be one of the plurality of cameras.

Variation 3

Video information processing apparatus ex101 may detect a capturing prohibited area. In this case, analyzer ex112 analyzes the captured image, and when the moving camera is capturing the capturing prohibited area, analyzer ex112 transmits a capturing prohibition signal to the moving camera. The moving camera stops capturing while receiving the capturing prohibition signal.

For example, analyzer ex112 matches three-dimensional virtual space restored by using SfM with the captured video, and accordingly analyzer ex112 determines whether the moving camera set in advance in space is capturing the capturing prohibited area. Alternatively, analyzer ex112 determines whether the moving camera is capturing the capturing prohibited area, by using a marker or characteristic object placed in space as a trigger. The capturing prohibited area is, for example, a rest room in the facility or in the stadium.

Moreover, when the user camera is capturing the capturing prohibited area, the user camera may notify the user of a fact that the current place is a capturing prohibited place, by causing a display connected wirelessly or with wires to display a message, or by outputting a sound or voice from a speaker or an earphone.

For example, a fact that capturing in the current direction of the camera orientation is prohibited is displayed as the message. Alternatively, the capturing prohibited area and the current capturing area are indicated on a displayed map. Moreover, the capturing is automatically resumed, for example, when the capturing prohibition signal is no longer output. Moreover, the capturing may be resumed when the capturing prohibition signal is not output and the user performs operations for resuming the capturing. Moreover, when the capturing is stopped and resumed twice or more in a short period, calibration may be performed again. Moreover, notification for checking the current position or for prompting movement may be given to the user.

Moreover, in a case of special work such as the police, pass code or fingerprint authentication or the like that disables such a function may be used for recording. Further, even in such a case, when the video of the capturing prohibited area is displayed or stored outside, image processing such as mosaic may be performed automatically.

The above configuration enables video information processing apparatus ex101 to set a certain area as the capturing prohibited area by performing determination of capturing prohibition and giving the user notification for stopping capturing.

Variation 4

Since it is necessary to collect videos of the plurality of viewpoints in order to construct three-dimensional virtual space from the videos, video information processing system ex100 sets an incentive for a user who transmits a captured video. For example, video information processing apparatus ex101 distributes videos with no charge or at discount rate to the user that transmits a video, or gives the user who transmits a video a point having a monetary value that can be used in an online or off-line store or in a game, or a point having a non-monetary value such as a social status in virtual space such as a game. Moreover, video information processing apparatus ex101 gives a particularly high point to the user who transmits the captured video of a valuable visual field (and/or viewpoint) such as a frequently requested video.

Variation 5

Video information processing apparatus ex101 may transmit additional information to the user camera based on an analysis result made by analyzer ex112. In this case, the user camera superimposes the additional information of the captured video, and displays the superimposed video on a screen. The additional information is, for example, information of a player such as a player name or height when a game in a stadium is captured, and the player name or a photograph of the player's face is displayed in association with each player in the video. Note that video information processing apparatus ex101 may extract the additional information by search via the Internet based on part or all areas of the video data. Moreover, camera ex102 may receive such additional information by the near field communication including Bluetooth (registered trademark) or by visible light communication from illumination of the stadium or the like, and may map the received additional information to the video data. Moreover, camera ex102 may perform this mapping based on a certain rule such as a table that is kept in the storage connected to camera ex102 wirelessly or with wires and that indicates correspondence between the information obtained by the visible light communication technology and the additional information. Camera ex102 may perform this mapping by using a result of a most probable combination by Internet search.

Moreover, in the monitoring system, a highly accurate monitoring system can be implemented, for example, by superimposition of information of a person on a blacklist on the user camera carried by a guard in the facility.

Variation 6

Analyzer ex112 may determine which area in the facility or in the stadium the user camera is capturing, by matching the free viewpoint video with the video captured by the user camera. Note that the method for determining the capturing area is not limited thereto, but various methods for determining the capturing area described in each of the above-described embodiments or other methods for determining the capturing area may be used.

Video information processing apparatus ex101 transmits a past video to the user camera based on the analysis result made by analyzer ex112. The user camera superimposes the past video on the captured video, or replaces the captured video with the past video, and displays the video on a screen.

For example, a highlight scene of a first half is displayed as a past video during halftime. This enables the user to enjoy the highlight scene of the first half during halftime as a video captured in a direction in which the user is watching. Note that the past video is not limited to the highlight scene of the first half, but may be the highlight scene of the past game held in the stadium. Moreover, timing at which video information processing apparatus ex101 distributes the past video is not limited to timing of distributing during halftime, but may be, for example, timing of distributing after the game end or during the game. In particular, in the case of distributing during the game, video information processing apparatus ex101 may distribute a scene which the user has missed and which is considered to be important, based on the analysis result made by analyzer ex112. Moreover, video information processing apparatus ex101 may distribute the past video only when there is a user request, or may distribute a message of distribution permission prior to distribution of the past video.

Variation 7

Video information processing apparatus ex101 may transmit advertisement information to the user camera based on the analysis result made by analyzer ex112. The user camera superimposes the advertisement information of the captured video, and displays the superimposed video on a screen.

The advertisement information may be distributed, for example, immediately before distribution of the past video during halftime or after the game end as described in variation 6. This enables a distribution company to obtain advertising rates from an advertiser and to provide the user with video distribution services at a low cost or with no charge. Moreover, video information processing apparatus ex101 may distribute a message of advertisement distribution permission immediately before distribution of the advertisement information, or may provide services with no charge only when the user views the advertisement, or may provide services at a lower cost than a cost in the case where the user does not view the advertisement.

Moreover, when the user clicks "Order now" or the like in response to the advertisement, a staff member who knows the position of the user based on the system or some positional information, or an automatic delivery system in the facility delivers an ordered drink to a seat of the user. Payment may be made by hand delivery to the staff member, or may be made based on credit card information set in an app of a mobile terminal or the like in advance. Moreover, the advertisement may include a link to an e-commerce site, and on-line shopping such as ordinary home delivery may be possible.

Variation 8

Video reception apparatus ex103 may be one of the cameras ex102 (user cameras). In this case, analyzer ex112 matches the free viewpoint video with the video captured by the user camera, and accordingly analyzer ex112 determines which area in the facility or in the stadium the user camera is capturing. Note that the method for determining the capturing area is not limited thereto.

For example, when the user performs a swipe operation in a direction of an arrow displayed on a screen, the user camera generates viewpoint information that indicates movement of the viewpoint in the direction. Video information processing apparatus ex101 reads from storage ex111 the video data that captures an area that is moved according to the viewpoint information from the area captured by the user camera determined by analyzer ex112, and video information processing apparatus ex101 starts transmission of the read video data to the user camera. Then, the user camera displays the video distributed from video information processing apparatus ex101, instead of the captured video.

This enables the user in the facility or in the stadium to view the video captured from a favorite viewpoint with such a simple operation as screen swipe. For example, a spectator who is watching a game on a third base side of a baseball stadium can view the video captured from the viewpoint on a first base side. Moreover, the monitoring system enables a guard in the facility to view, for example, the video from the viewpoint from which the guard wants to check or the video to be watched closely as an interruption from a center, while changing the viewpoint adaptively, with such a simple operation as screen swipe. For this reason, a highly accurate monitoring system can be implemented.

Moreover, distribution of the video to the user in the facility or in the stadium is effective, for example, even when an obstacle exists between the user camera and an object to be captured, and there is an invisible area. In this case, he user camera may switch the video of some area of the areas captured by the user camera that includes the obstacle, from the captured video to a video distributed from video information processing apparatus ex101, and may display the distributed video, or the user camera may switch the entire screen from the captured video to the distributed video, and may display the distributed video. Moreover, the user camera may combine the captured video with the distributed video to display the video that seems to penetrate the obstacle such that the object to be viewed is visible. Even when the object to be captured is invisible from the position of the user due to influence of the obstacle, this configuration can reduce the influence of the obstacle because the user can view the video distributed from video information processing apparatus ex101.

Moreover, when the distributed video is displayed as the video of the area invisible due to the obstacle, display switching control different from display switching control depending on input processing made by the user such as the screen swipe described above may be performed. For example, when it is determined that the capturing area includes the obstacle, based on information of movement and capturing direction of the user camera, and based on positional information of the obstacle obtained in advance, display switching from the captured video to the distributed video may be performed automatically. Moreover, when it is determined from analysis of the captured video data that the obstacle which is not the object to be captured is being captured, display switching from the captured video to the distributed video may be performed automatically. Moreover, when area of the obstacle in the captured video (for example, a number of pixels) exceeds a predetermined threshold, or when a ratio of the area of the obstacle to area of the object to be captured exceeds a predetermined proportion, display switching from the captured video to the distributed video may be performed automatically.

Note that the display switching from the captured video to the distributed video, and display switching from the distributed video to the captured video may performed in response to the input processing made by the user.

Variation 9

A speed at which the video data is transmitted to video information processing apparatus ex101 may be instructed based on importance of the video data captured by each camera ex102.

In this case, analyzer ex112 determines importance of video data stored in storage ex111 or importance of camera ex102 that captures the video data. The determination of the importance here is made based on, for example, a number of persons or a number of moving objects in the video, the information such as image quality of the video data, or combination thereof.

Moreover, the determination of the importance of the video data may be made based on the position of camera ex102 that captures the video data or the area captured in the video data. For example, when a plurality of other capturing cameras ex102 exists near camera ex102 concerned, the importance of the video data captured by camera ex102 concerned is set low. Moreover, when the position of camera ex102 concerned is distant from the positions of other cameras ex102, but there exists a plurality of other cameras ex102 that captures an identical area, the importance of the video data captured by camera ex102 concerned is set low. Moreover, the determination of the importance of the video data may be made based on frequency of requests in video distribution services. Note that the method for determining the importance is limited to neither the above-described methods nor combination thereof, but may be a method according to the configuration or purpose of the monitoring system or video distribution system.

Moreover, the determination of the importance may not be made based on the captured video data. For example, the importance of camera ex102 that transmits the video data to terminals other than video information processing apparatus ex101 may be set high. Conversely, the importance of camera ex102 that transmits the video data to terminals other than video information processing apparatus ex101 may be set low. Accordingly, for example, when a plurality of services that needs transmission of video data uses a common communication band, a degree of freedom of controlling the communication band according to a purpose or characteristics of each service increases. This prevents quality of each service to degrade because necessary video data cannot be obtained.

Moreover, analyzer ex112 may determine the importance of the video data by using the free viewpoint video and the captured video of camera ex102.

Video information processing apparatus ex101 transmits a communication speed instruction signal to camera ex102 based on a determination result of the importance made by analyzer ex112. Video information processing apparatus ex101 gives instruction of high speed communication to, for example, camera ex102 that is capturing a video with high importance. Moreover, n addition to speed control, regarding important information, video information processing apparatus ex101 may transmit a signal that instructs a scheme for sending the important information twice or more in order to reduce disadvantages owing to loss. This enables efficient communication in the entire facility or in the entire stadium. Note that communication between camera ex102 and video information processing apparatus ex101 may be wired communication, or may be wireless communication. Moreover, video information processing apparatus ex101 may control only any one of the wired communication and wireless communication.

Camera ex102 transmits the captured video data to video information processing apparatus ex101 at the communication speed according to the communication speed instruction signal. Note that when retransmission fails predetermined number of times, camera ex102 may stop retransmission of the captured video data and start transmission of next captured video data. This enables efficient communication in the entire facility or in the entire stadium and high-speed processing in analyzer ex112 can be implemented.

Moreover, when the communication speed allocated to each camera ex102 fails to have a bandwidth sufficient for transmitting the captured video data, camera ex102 may convert the captured video data into video data with a bit rate that enables transmission at the allocated communication speed, and transmit the converted video data, or may stop transmission of the video data.

Moreover, as described above, when the video data is used for preventing occurrence of a blind spot, only some area of the capturing areas in the captured video data is likely to be needed for filling the blind spot. In this case, camera ex102 may generate extracted video data by extracting at least the area needed for preventing occurrence of the blind spot from the video data, and transmit the generated extracted video data to video information processing apparatus ex101. This configuration can realize suppression of occurrence of the blind spot at a narrower communication bandwidth.

Moreover, for example, when superimposed display or video distribution of the additional information is performed, camera ex102 needs to transmit the positional information and information of the capturing direction of camera ex102 to video information processing apparatus ex101. In this case, camera ex102 to which only the bandwidth insufficient for transmitting the video data is allocated may transmit the positional information and information of the capturing direction detected by camera ex102 only. Moreover, when video information processing apparatus ex101 estimates the positional information and information of the capturing direction of camera ex102, camera ex102 may convert the captured video data into video data with resolution necessary for estimation of the positional information and the information of the capturing direction, and transmit the converted video data to video information processing apparatus ex101. This configuration can also provide superimposed display or video distribution services of the additional information to camera ex102 to which only the narrow communication bandwidth is allocated. Moreover, since video information processing apparatus ex101 can acquire information of the capturing area from more cameras ex102, video information processing apparatus ex101 is effective, for example, for using information of the capturing area for a purpose of detecting an area that attracts attention, or the like.

Note that the above-described switching of transmission processing of the video data according to the allocated communication bandwidth may be performed by camera ex102 based on the notified communication bandwidth, or video information processing apparatus ex101 may determine the operation of each camera ex102 and notify each camera ex102 of a control signal that indicates the determined operation. This enables appropriate sharing of tasks of processing according to an amount of calculation necessary for determination of switching of the operations, throughput of camera ex102, required communication bandwidth, and the like.

Variation 10

Analyzer ex112 may determine the importance of the video data based on the visual field information (and/or viewpoint information) transmitted from video reception apparatus ex103. For example, analyzer ex112 sets high importance of the captured video data including a lot of areas indicated by the visual field information (and/or viewpoint information). Moreover, analyzer ex112 may determine the importance of the video data in consideration of the number of persons or the number of moving objects in the video. Note that the method for determining the importance is not limited thereto.

Note that a communication control method described in the present embodiment does not necessarily need to be used in a system that reconstructs the three-dimensional shape from the plurality of pieces of video data. For example, when video data is transmitted by wired communication and/or wireless communication selectively or at a different transmission speed in an environment where there exists a plurality of cameras ex102, the communication control method described in the present embodiment is effective.

Variation 11

In the video distribution system, video information processing apparatus ex101 may transmit an outline video that indicates an entire capturing scene to video reception apparatus ex103.

Specifically, when video information processing apparatus ex101 has received a distribution request transmitted from video reception apparatus ex103, video information processing apparatus ex101 reads the outline video of an inside of the entire facility or an inside of the entire stadium from storage ex111, and transmits the external appearance video to video reception apparatus ex103. This outline video may have a long update interval (may have a low frame rate), and may have low image quality. A viewer touches a portion to watch in the outline video displayed on a screen of video reception apparatus ex103. Accordingly, video reception apparatus ex103 transmits the visual field information (and/or viewpoint information) corresponding to the touched portion to video information processing apparatus ex101.

Video information processing apparatus ex101 reads the video data corresponding to the visual field information (and/or viewpoint information) from storage ex111, and transmits the video data to video reception apparatus ex103.

Moreover, analyzer ex112 generates the free viewpoint video by preferentially restoring the three-dimensional shape (three-dimensional reconfiguration) of the area indicated by the visual field information (and/or viewpoint information). Analyzer ex112 restores the three-dimensional shape of an inside of the entire facility or an inside of the entire stadium with accuracy in the extent of indicating the outline. Accordingly, video information processing apparatus ex101 can efficiently restore the three-dimensional shape. As a result, a high frame rate and high image quality of the free viewpoint video of the area the viewer wants to watch can be implemented.

Variation 12

Note that video information processing apparatus ex101 may store in advance as a previous video, for example, three-dimensional shape restored data of the facility or stadium generated in advance from design drawings or the like. Note that the previous video is not limited thereto, but may be virtual space data in which unevenness of space obtained from a depth sensor and a picture derived from a past image or video data or an image or video data at a time of calibration are mapped for each object.

For example, when soccer is played in a stadium, analyzer ex112 may restore the three-dimensional shapes of players and a ball, and generate the free viewpoint video by combining the obtained restored data and the previous video. Alternatively, analyzer ex112 may preferentially restore the three-dimensional shapes of players and a ball. Accordingly, video information processing apparatus ex101 can restore the three-dimensional shape efficiently. As a result, a high frame rate and high image quality of the free viewpoint video regarding players and a ball to which viewers pay attention can be implemented. Moreover, in the monitoring system, analyzer ex112 may restore the three-dimensional shapes of persons and moving objects only or preferentially restore the three-dimensional shapes of persons and moving objects.

Variation 13

Time of each apparatus may be calibrated when capturing starts, based on information such as reference time of the server. Analyzer ex112 restores the three-dimensional shape by using the plurality of pieces of video data captured at time within a preset time range among the plurality of pieces of captured video data captured by the plurality of cameras ex102 in accordance with accuracy of time settings. This detection of time uses, for example, time when the captured video data is stored in storage ex111. Note that the method for detecting time is not limited thereto. Accordingly, since video information processing apparatus ex101 can restore the three-dimensional shape efficiently, a high frame rate and high image quality of the free viewpoint video can be implemented.

Alternatively, analyzer ex112 may restore the three-dimensional shape by using high-quality data, or by preferentially using only high-quality data among the plurality of pieces of video data stored in storage ex111.

Variation 14

Analyzer ex112 may restore the three-dimensional shape by using camera attribute information. For example, analyzer ex112 may generate the three-dimensional shape video by a method such as a volume intersection technique or a multi-view stereo method by using camera attribute information. In this case, camera ex102 transmits the captured video data and the camera attribute information to video information processing apparatus ex101. Examples of the camera attribute information include a capturing position, a capturing angle, capturing time, and zoom magnification.

Accordingly, since video information processing apparatus ex101 can restore the three-dimensional shape efficiently, a high frame rate and high image quality of the free viewpoint video can be implemented.

Specifically, camera ex102 defines three-dimensional coordinates in the facility or in the stadium, and transmits to video information processing apparatus ex101 information as camera attribute information that indicates an angle, zoom magnification, and time of capturing of certain coordinates by camera ex102, together with the video. Moreover, when camera ex102 is activated, a clock on a communication network in the facility or in the stadium is synchronized with a clock in the camera, and time information is generated.

Figure 9:
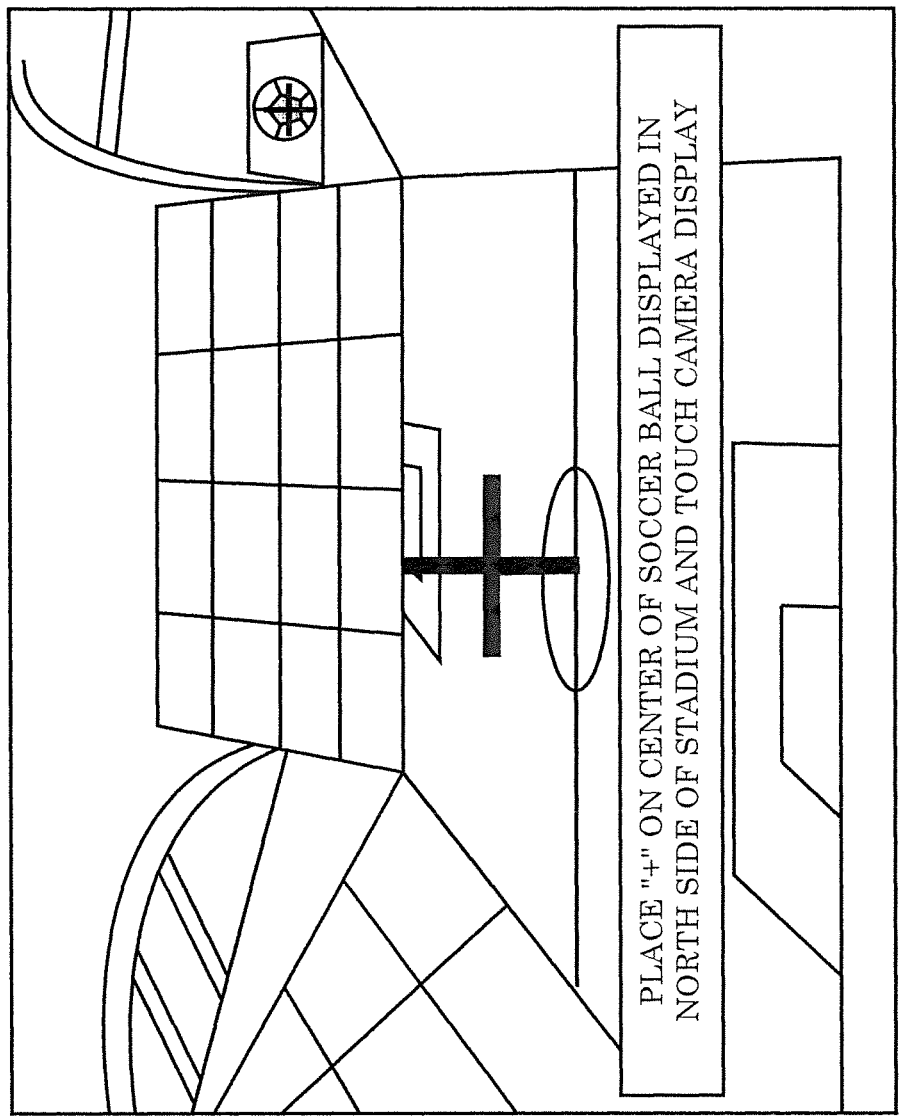
FIG. 9 is a diagram illustrating an example of a notification screen displayed when a camera starts.

Moreover, the positional and angle information of camera ex102 is acquired by pointing camera ex102 at a specific point in the facility or in the stadium when camera ex102 is activated or at any timing. FIG. 9 is a diagram illustrating an example of notification displayed on a screen of camera ex102 when camera ex102 is activated. When the user matches "+" displayed in a center of the screen with "+" which is in a center of a soccer ball in advertisement in north of the stadium in response to this notification and touches the display of camera ex102, camera ex102 acquires vector information from camera ex102 to the advertisement, and identifies reference of the camera position and angle. Subsequently, camera coordinates and an angle at each time are identified from motion information of camera ex102. Of course, the display is not limited thereto, and display that instructs coordinates, an angle, or a movement speed of the capturing area during a capturing period by using an arrow or the like may be used.

The coordinates of camera ex102 may be identified by using a radio wave of the global positioning system (GPS), wireless fidelity (WiFi) (registered trademark), third generation (3G), long term evolution (LTE), and fifth generation (5G) (wireless LAN), or by using the near field communication such as beacon (Bluetooth (registered trademark), ultrasonic waves). Moreover, information about which base station in the facility or in the stadium has received the captured video data may be used.

Variation 15

The system may be provided as an application that operates on a mobile terminal such as a smartphone.

Accounts of various social networking services (SNS) or the like may be used for login to the system. Note that an account dedicated to an app or a guest account that has limited functions may be used. Favorite videos, favorite accounts or the like can be evaluated by using the accounts in such a manner. Moreover, the bandwidth is preferentially allocated to, for example, video data similar to video data that is being captured or viewed, or to video data of the viewpoint similar to the viewpoint of video data that is being captured or viewed, and this can increase resolution of these pieces of video data. Accordingly, the three-dimensional shape from these viewpoints can be restored with better accuracy.

Moreover, the user can preferentially watch the selected image over other users by selecting a favorite image video and by following the other party with the application, or the user can have connection by text chatting or the like on condition of approval of the other party. Thus, it is possible to generate a new community.

Thus, connection between the users in the community can activate capturing itself or sharing of captured images, and can prompt restoration of three-dimensional shapes with higher accuracy.

Moreover, according to settings of connection in the community, the user can edit images or videos captured by another person, or can perform collage of an image of another person and an image of the user to create a new image or video. This enables sharing of a new video work, such as sharing the new image or video only with persons in the community. Moreover, the video work can also be used for a game of augmented reality or the like by inserting a computer-graphics (CG) character in this editing.

Moreover, since the system enables sequential output of three-dimensional model data, a 3D printer or the like that the facility has can output a three-dimensional object, based on the three-dimensional model data in a characteristic scene such as a goal scene. This also enables sale after the game of an object based on the scene during the game as a souvenir such as a key ring, or distribution after the game of such an object to participating users. Of course, this also enables printing of an image captured from the best viewpoint as an ordinary photograph.

Variation 16

A center connected to the system can used the above-described system to manage a rough state of the overall region, for example, from a video of a vehicle-mounted camera of the police and a wearable camera of a police officer, and the like.

During ordinary patrol, still images are transmitted and received, for example, every several minutes. Moreover, the center identifies a region in which crime is highly likely to occur, based on a criminal map prepared based on a result of analysis using past criminal data or the like. Alternatively, the center keeps regional data related to a crime rate identified in this manner. In a region with the identified high-crime-rate, high frequency of transmission and reception of images may be set, or a change of images to moving images may be made. Moreover, when an incident occurs, moving images or three-dimensional reconfiguration data using SfM may be used. Moreover, the center or each terminal can compensate the image or virtual space by simultaneously using information from other sensors such as a depth sensor and a thermal sensor, and accordingly the police officer can understand the situation with better accuracy.

Moreover, the center can used the three-dimensional reconfiguration data to feed back information of the object to the plurality of terminals. This enables each individual person having a terminal to keep track of the object.

Moreover, in these years, capturing has been performed from the air by an apparatus that can fly such as a quadcopter and a drone, for purposes of investigation of buildings or environment, capturing with realism such as sports or the like. While blur of images is likely to become a problem in capturing by such an autonomous moving apparatus, SfM can create three dimensions while compensating the blur with a position and an inclination. This can realize improvement in image quality and improvement in restoration accuracy of space.

Moreover, installation of a vehicle-mounted camera that captures an outside of a car is mandatory in some countries. In such a vehicle-mounted camera, weather and a road surface state in a direction of a destination, traffic congestion level and the like can be understood with better accuracy by using three-dimensional data modeled from a plurality of images.

Variation 17

The above-described system may also be applied to a system that performs distance measurement or modeling of a building or equipment by using a plurality of cameras, for example.

Here, for example, in a case of capturing an image of a building from above using one drone, and performing distance measurement or modeling of the building, there is a problem in that an image of an animal may be captured by the camera during distance measurement, thereby reducing the accuracy of distance measurement. There is also a problem in that distance measurement and modeling cannot be performed with respect to an animal.

Meanwhile, by using a plurality of cameras (fixed cameras, smartphones, wearable cameras, drones, etc.) as described above, distance measurement and modeling of a building may be performed with stable accuracy regardless of presence or absence of an animal. Also, distance measurement and modeling may be performed with respect to an animal.

Specifically, for example, at a construction site, a camera is attached to a helmet or the like of a worker. This allows distance measurement of the building to be performed in parallel to the work of the worker. Also, efficiency of work may be increased, and mistakes may be prevented. Furthermore, modeling of the building may be performed by using a video captured by the camera worn by the worker. Moreover, a manager at a remote location may check the progress by looking at a modeled building.

Moreover, this system may be used for inspection of equipment that cannot be stopped, such as a machine at a factory or a power station. Also, this system can be used to inspect opening/closing of a bridge or a dam, or to inspect an abnormality in the operation of a ride in an amusement park, for example.

Moreover, by monitoring the level of traffic jam or the amount of traffic on a road by this system, a map indicating the level of traffic jam or the amount of traffic on the road in each time zone may be created.

Embodiment 4

The processing described in each of the above-described embodiments can be carried out easily in a standalone computer system by recording a program for implementing the configuration of the image processing method described in each embodiment on a storage medium. The storage medium may be any type of medium capable of storing the program, such as a magnetic disk, an optical disc, a magneto-optical disk, an integrated circuit (IC) card, and a semiconductor memory.

Here, application examples of the image processing method described in each of the embodiments and the systems using the application examples will be further described. The systems include an apparatus that uses the image processing method. A change in other configurations of the systems can be made appropriately in accordance with the circumstances.

Figure 10:
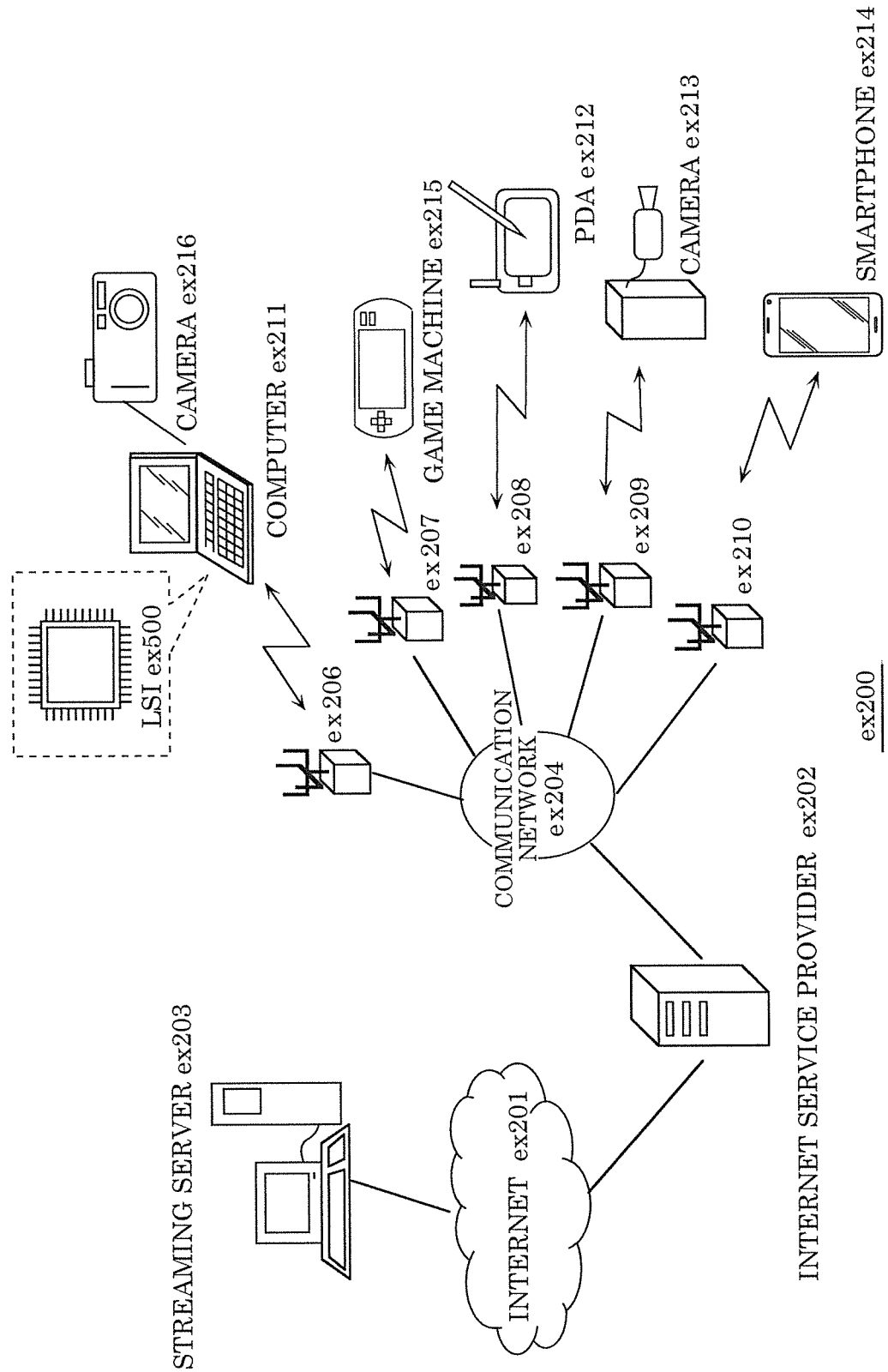
FIG. 10 is a general configuration diagram of a content provision system that implements content distribution services.

FIG. 10 is a diagram illustrating an overall configuration of content providing system ex200 that implements content distribution services. An area in which communication services are provided is divided with a desired size. Base stations ex206, ex207, ex208, ex209, and ex210 which are fixed wireless stations are installed in respective cells.

In content providing system ex200, various devices such as computer ex211, personal digital assistant (PDA) ex212, camera ex213, smartphone ex214, and game machine ex215 are connected to Internet ex201 via Internet service provider ex202, wide area network (WAN) ex204, and base stations ex206 to ex210.

However, the configuration of content providing system ex200 is not limited to the configuration illustrated in FIG. 10, and any elements may be combined and connected. Moreover, each device may be connected directly to telephone lines, cable TV, or WAN ex204 such as optical communication, instead of via base stations ex206 to ex210 which are fixed wireless stations. Alternatively, each device may be interconnected directly via near field communication or the like.

Camera ex213 is a device capable of capturing moving images, such as a digital camcorder. Camera ex216 is a device capable of capturing still images and moving images, such as a digital camera. Moreover, smartphone ex214 is, for example, a smartphone conforming to a global system for mobile communication (GSM) (registered trademark) scheme, a code division multiple access (CDMA) scheme, a wideband-code division multiple access (W-CDMA) scheme, an long term evolution (LTE) scheme, an high speed packet access (HSPA) scheme, or a communication scheme using high-frequency bands, or a personal handyphone system (PHS), and smartphone ex214 may be any of them.

In content providing system ex200, camera ex213 or the like is connected to streaming server ex203 via base station ex209 and WAN ex204. Accordingly, live streaming or the like becomes possible. In the live streaming, coding processing is performed on content (for example, a video of a music event) captured by the user using camera ex213 and the resulting content is transmitted to streaming server ex203. Meanwhile, streaming server ex203 perform stream distribution of content data transmitted to a client that has made a request. Examples of the client include computer ex211, PDA ex212, camera ex213, smartphone ex214, and game machine ex215 capable of decoding the data that has undergone the coding processing. Each device that has received the distributed data performs decoding processing on the received data to reproduce the data.

Note that the coding processing of the captured video may be performed by camera ex213, or may be performed by streaming server ex203 that performs data transmission processing, or camera ex213 and streaming server ex203 may share tasks of the coding processing of the captured video with each other. Similarly, the decoding processing of the distributed data may be performed by the client, or may be performed by streaming server ex203, or the client and streaming server ex203 may share tasks of the decoding processing of the captured video with each other. Moreover, in addition to still and/or moving image data captured by camera ex213, still and/or moving image data captured by camera ex216 may be transmitted to streaming server ex203 via computer ex211. In this case, the coding processing may be performed by any of camera ex216, computer ex211, and streaming server ex203, or camera ex216, computer ex211, and streaming server ex203 may share tasks of the coding processing with each other. Further, regarding display of the decoded image, a plurality of devices connected to the system may cooperate to display an identical image, or a device having a large display unit may display the entire image and a device such as smartphone ex214 may enlarge and display some area of the image.

Moreover, the coding processing and the decoding processing are performed in general by LSI ex500 in computer ex211 or each device. LSI ex500 may include a single chip or a plurality of chips. Note that software for coding/decoding a moving image may be recorded on any recording medium (such as a CD-ROM, a flexible disk, and a hard disk) that is readable by computer ex211 or the like, and the coding processing and the decoding processing may be performed using the software. Further, in the case where smartphone ex214 is equipped with a camera, moving image data acquired by the camera may be transmitted. This moving image data is data that has been coded by LSI ex500 in smartphone ex214.

Moreover, streaming server ex203 may be a plurality of servers or a plurality of computers that processes, records, and distributes data.

In the above-described manner, content providing system ex200 enables the client to receive and reproduce coded data. Thus, content providing system ex200 enables the client to receive, decode, and reproduce in real time information transmitted by a user, and enables even a user having no special right or equipment to implement personal broadcasting.

Figure 11:
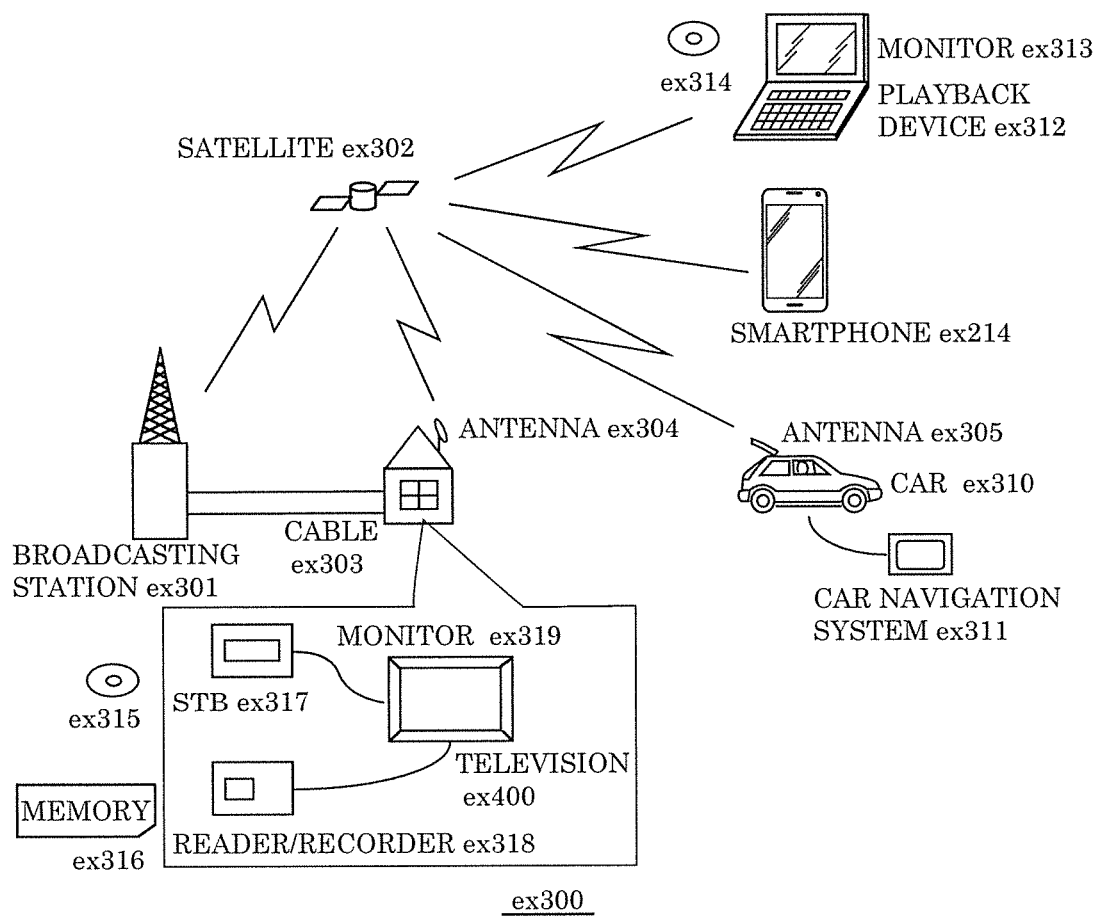
FIG. 11 is a general configuration diagram of a digital broadcasting system.

Note that in addition to the example of content providing system ex200, each of the above-described embodiments may also be applied to digital broadcasting system ex300, as illustrated in FIG. 11. Specifically, broadcasting station ex301 transmits multiplexed data obtained by multiplexing video data with music data or the like via a radio wave to communication or satellite ex302. This video data is data coded by the moving image coding method described in each of the above-described embodiments. Broadcasting satellite ex302 that has received this data transmits a broadcasting radio wave, and home antenna ex304 capable of receiving satellite broadcasting receives this radio wave. An apparatus such as television (receiver) ex400 or set top box (STB) ex317 decodes and reproduces the received multiplexed data.

Moreover, the moving image decoding apparatus or the moving image coding apparatus described in each of the above-described embodiments can be implemented in reader/recorder ex318 that reads and decodes the multiplexed data recorded on recording medium ex315 such as a digital versatile disc (DVD) and a blu-ray disc (BD) or memory ex316 such as an secured digital (SD), or that codes a video signal and further multiplexes the video signal with a music signal depending on circumstances, and writes the resulting signal on recording medium ex315 or memory ex316. In this case, monitor ex319 may display the reproduced video signal, and another apparatus or system can reproduce the video signal by using recording medium ex315 or memory ex316 having the multiplexed data recorded thereon. Moreover, the moving image decoding apparatus may be implemented in set top box ex317 connected to cable ex303 for a community antenna television system (CATV) or antenna ex304 for satellite/terrestrial broadcasting, and monitor ex319 of the television may display the video signal. At this time, the moving image decoding apparatus may be incorporated into the television instead of the set top box.

Figure 12:
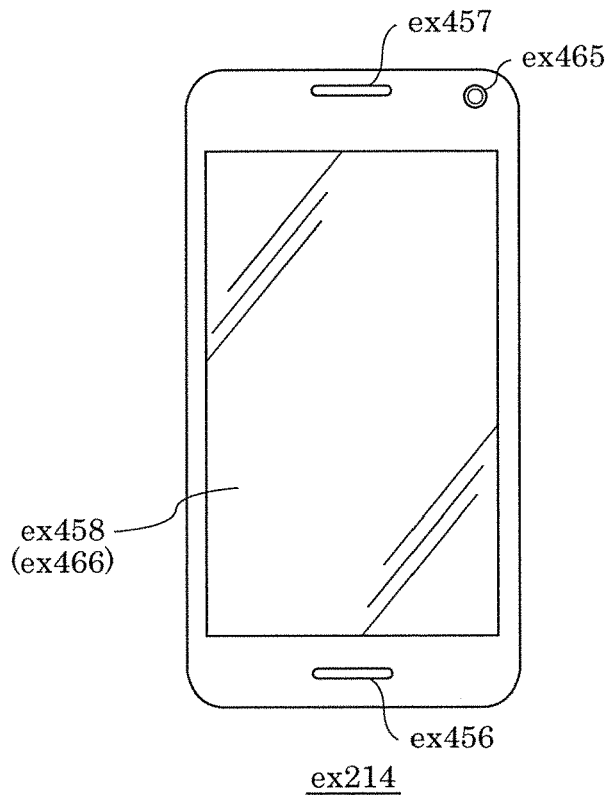
FIG. 12 is a diagram illustrating an example of a smartphone.
Figure 13:
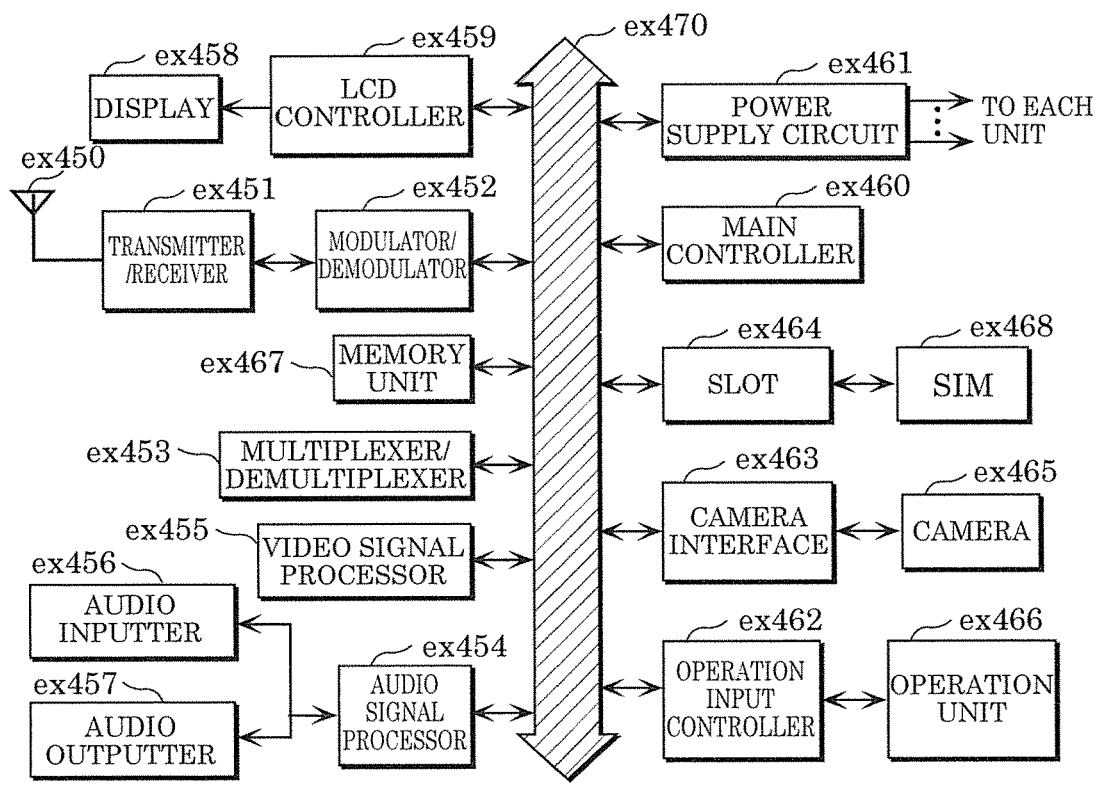
FIG. 13 is a block diagram illustrating a configuration example of a smartphone.

FIG. 12 is a diagram illustrating smartphone ex214. Moreover, FIG. 13 is a diagram illustrating a configuration example of smartphone ex214. Smartphone ex214 includes antenna ex450 that transmits and receives a radio wave to and from base station ex210, camera ex465 capable of capturing a video and a still image, and display unit ex458 such as a liquid crystal display that displays the video captured by camera ex465 and data obtained by decoding a video or the like received on antenna ex450. Smartphone ex214 further includes operation unit ex466 which is a touch panel or the like, audio outputter ex457 such as a speaker for outputting audio, audio inputter ex456 such as a microphone for inputting audio, memory unit ex467 capable of storing coded data or decoded data of a captured video, a captured still image, recorded audio, a received video, a received still image, or a received email, memory ex316 illustrated in FIG. 11, or slot ex464 which is an interface to SIM ex468 for identifying a user and for authentication of access to various types of data including a network.

In smartphone ex214, power supply circuit ex461, operation input controller ex462, video signal processor ex455, camera interface ex463, liquid crystal display (LCD) controller ex459, modulator/demodulator ex452, multiplexer/demultiplexer ex453, audio signal processor ex454, slot ex464, and memory unit ex467 are connected via bus ex470 to main controller ex460 that comprehensively controls display unit ex458, operation unit ex466 and the like, respectively.

When an on-hook/power key is turned on by a user operation, power supply circuit ex461 supplies electric power to each unit from a battery pack, and accordingly activates smartphone ex214 into an operable state.

In smartphone ex214 based on control of main controller ex460 that includes a CPU, a ROM, a RAM and the like, audio signal processor ex454 converts an audio signal recorded with audio inputter ex456 in a voice call mode into a digital audio signal, and modulator/demodulator ex452 performs spread spectrum processing on this digital audio signal, and transmitter/receiver ex451 performs digital-to-analog conversion processing and frequency conversion processing on this signal and then transmits the resulting signal via antenna ex450. Moreover, smartphone ex214, amplifies reception data received via antenna ex450 in the voice call mode and performs frequency conversion processing and analog-to-digital conversion processing on the data, and modulator/demodulator ex452 performs spread spectrum processing on the resulting signal, and audio signal processor ex454 converts the resulting signal into an analog audio signal, and then audio outputter ex457 outputs the analog audio signal.

In the case where an email is transmitted in a data communication mode, text data of the email input by operation of operation unit ex466 or the like of a body is sent to main controller ex460 via operation input controller ex462. In main controller ex460 modulator/demodulator ex452 performs spread spectrum processing on the text data, and transmitter/receiver ex451 performs digital-to-analog conversion processing and frequency conversion processing on the text data and then transmits the resulting text data to base station ex210 via antenna ex450. In the case of receiving an email, substantially the opposite processing is performed on the received data, and the resulting data is output to display unit ex458.

In the case where a video, a still image, or a combination of a video and audio are transmitted in the data communication mode, video signal processor ex455 compresses and codes a video signal supplied from camera ex465 by the moving image coding method described in each of the above embodiments, and sends the coded video data to multiplexer/demultiplexer ex453. Moreover, audio signal processor ex454 codes an audio signal recorded with audio inputter ex456 while the video, the still image, or the like is being captured by camera ex465, and sends the coded audio data to multiplexer/demultiplexer ex453.

Multiplexer/demultiplexer ex453 multiplexes the coded video data supplied from video signal processor ex455 and the coded audio data supplied from audio signal processor ex454 by a predetermined scheme. Modulator/demodulator (modulation/demodulation circuit) ex452 performs spread spectrum processing on the resulting multiplexed data. Transmitter/receiver ex451 performs digital-to-analog conversion processing and frequency conversion processing on the multiplexed data, and then transmits the resulting data via antenna ex450.

In the case of receiving data of a moving image file linked to a website or the like in the data communication mode, or in the case of receiving an email having a video or audio attached thereto, multiplexer/demultiplexer ex453 demultiplexes multiplexed data into a bitstream of video data and a bitstream of audio data in order to decode the multiplexed data received via antenna ex450. Multiplexer/demultiplexer ex453 supplies the coded video data to video signal processor ex455 and the coded audio data to audio signal processor ex454 via synchronization bus ex470. Video signal processor ex455 decodes the video signal by a moving image decoding method corresponding to the moving image coding method described in each of the above embodiments. Display unit ex458 displays via LCD controller ex459 a video or still image in the moving image file linked to the website. Moreover, audio signal processor ex454 decodes the audio signal, and audio outputter ex457 outputs audio.

Moreover, like television ex400, three implementation forms of a terminal such as smartphone ex214, that is, a transmission/reception terminal including both an encoder and a decoder, a transmission terminal including only an encoder, and a reception terminal including only a decoder, are conceivable. Further, digital broadcasting system ex300 in which multiplexed data obtained by multiplexing video data with music data or the like is received and transmitted is described above; however, the multiplexed data may be data obtained by multiplexing text data or the like related to the video other than audio data, or may be video data as is instead of the multiplexed data.

Moreover, the present invention is not limited to the above-described exemplary embodiments, and various variations or modifications can be made without departing from the scope of the present invention.

INDUSTRIAL APPLICABILITY

The present disclosure is applicable to a video distribution system or the like that distributes a free-viewpoint video.

What is claimed is:

1. A camerawork generating method, comprising:
   generating, from a multi-view video of a same scene captured from different viewpoints, a three-dimensional model for the scene;
   determining a target scene that is a target for which a free-viewpoint video of the three-dimensional model as viewed from a virtual camera is to be generated, the target scene being included in the scene;
   generating a camerawork representing a temporal change in a position and an orientation of the virtual camera in the free-viewpoint video;
   receiving a user input to acquire an evaluation of the camerawork; and
   generating another camerawork based on the evaluation.

2. The camerawork generating method according to claim 1, wherein
   in the determining of the target scene, the target scene is determined using one of the multi-view video and the three-dimensional model.

3. The camerawork generating method according to claim 1, wherein
   in the determining of the target scene, the target scene is determined using sound of the scene.

4. The camerawork generating method according to claim 1, wherein
   in the generating of the camerawork, the position and the orientation of the virtual camera are determined such that an object of a predetermined type associated with the target scene is included in the free-viewpoint video.

5. The camerawork generating method according to claim 1, wherein
   in the generating of the camerawork, the position and the orientation of the virtual camera are determined based on a quality of a plurality of portions included in the three-dimensional model.

6. The camerawork generating method according to claim 1, further comprising:
   displaying the camerawork.

7. The camerawork generating method according to claim 1, further comprising:
   generating the free-viewpoint video from one of the three-dimensional model and the multi-view video, using the camerawork.

8. The camerawork generating method according to claim 7, wherein
   in the generating of the free-viewpoint video, a shake is added to the free-viewpoint video.

9. A video processing device, comprising:
   a processor; and
   a non-transitory memory having stored thereon executable instructions, which when executed, cause the processor to perform:
      generating, from a multi-view video of a same scene captured from different viewpoints, a three-dimensional model for the scene;
      determining a target scene that is a target for which a free-viewpoint video of the three-dimensional model as viewed from a virtual camera is to be generated, the target scene being included in the scene; and
      generating a camerawork representing a temporal change in a position and an orientation of the virtual camera in the free-viewpoint video;
      receiving a user input to acquire an evaluation of the camerawork; and
      generating another camerawork based on the evaluation.

10. A camerawork generating method, comprising:
    generating, from a multi-view video of a same scene captured from different viewpoints, a three-dimensional model for the scene;
    determining a target scene that is a target for which a free-viewpoint video of the three-dimensional model as viewed from a virtual camera is to be generated, the target scene being included in the scene; and
    generating a camerawork representing a temporal change in a position and an orientation of the virtual camera in the free-viewpoint video,
    wherein in the generating of the free-viewpoint video, a shake is added to the free-viewpoint video.

* * * * *